United States Patent

[11] 3,618,043

[72] Inventor John S. Whiting
Canandaigua, N.Y.
[21] Appl. No. 876,981
[22] Filed Nov. 14, 1969
[45] Patented Nov. 2, 1971
[73] Assignee General Dynamics Corporation

[54] INFORMATION-HANDLING SYSTEM ESPECIALLY FOR MAGNETIC RECORDING AND REPRODUCING OF DIGITAL DATA
10 Claims, 22 Drawing Figs.

[52] U.S. Cl. 340/172.5
[51] Int. Cl. G06f 5/02, G05b 13/02, G11b 5/86
[50] Field of Search 307/233, 269, 209; 340/172.5, 347

[56] References Cited

UNITED STATES PATENTS

| | | | |
|---|---|---|---|
| 3,217,316 | 11/1965 | Trampel | 307/209 X |
| 3,241,122 | 3/1966 | Bardell, Jr. | 340/172.5 |
| 3,284,616 | 11/1966 | Ernyei et al. | 340/172.5 |
| 3,317,901 | 5/1967 | Clapper | 340/172.5 |
| 3,340,514 | 9/1967 | Swift | 340/172.5 |
| 3,438,619 | 4/1969 | Gowan | 340/172.5 |
| 3,461,432 | 8/1969 | Keiter et al. | 340/172.5 |
| 3,516,071 | 6/1970 | Roos | 340/172.5 |

*Primary Examiner*—Raulfe B. Zache
*Assistant Examiner*—Paul R. Woods
*Attorneys*—Martin LuKacher ABSTRACT: A system for storage on a magnetic record medium (tape or disc) of data with an extremely high packing density is described. Binary input information is encoded into a ternary signal for recording. That ternary signal has spectral properties which facilitate recording with extremely high bit-packing density. The ternary signal also contains timing information. On playback the signal is decoded into binary coded ternary form. Timing information with respect to words of ternary data, as well as the individual terts which make up the words, is also derived. The system includes means for synchronizing the reproduced data in accordance with the timing information derived from the data itself, as well as with an external clock, and decodes the data into the original binary form.

INVENTOR.
JOHN S. WHITING
BY
ATTORNEY

INVENTOR.
JOHN S. WHITING
BY
ATTORNEY

INVENTOR.
JOHN S. WHITING
BY
ATTORNEY

INVENTOR.
JOHN S. WHITING
BY
ATTORNEY

PATENTED NOV 2 1971 3,618,043

SHEET 05 OF 14

ENCODING/DECODING TABLE

| DECIMAL | BINARY | | | | VCT | | | | BCT | | | | | | | |
|---|---|---|---|---|---|---|---|---|---|---|---|---|---|---|---|---|
| | D | C | B | A | $T_4$ | $T_3$ | $T_2$ | $T_1$ | $d_1$ | $d_2$ | $c_1$ | $c_2$ | $b_1$ | $b_2$ | $a_1$ | $a_2$ |
| 0 | 0 | 0 | 0 | 0 | − | + | + | − | 0 | 1 | 1 | 0 | 1 | 0 | 0 | 1 |
| 1 | 0 | 0 | 0 | 1 | + | 0 | 0 | − | 1 | 0 | 0 | 0 | 0 | 0 | 0 | 1 |
| 2 | 0 | 0 | 1 | 0 | 0 | 0 | − | + | 0 | 0 | 0 | 0 | 0 | 1 | 1 | 0 |
| 3 | 0 | 0 | 1 | 1 | + | 0 | − | 0 | 1 | 0 | 0 | 0 | 0 | 1 | 0 | 0 |
| 4 | 0 | 1 | 0 | 0 | 0 | − | + | 0 | 0 | 0 | 0 | 1 | 1 | 0 | 0 | 0 |
| 5 | 0 | 1 | 0 | 1 | + | − | + | − | 1 | 0 | 0 | 1 | 1 | 0 | 0 | 1 |
| 6 | 0 | 1 | 1 | 0 | 0 | − | 0 | + | 0 | 0 | 0 | 1 | 0 | 0 | 1 | 0 |
| 7 | 0 | 1 | 1 | 1 | + | − | 0 | 0 | 1 | 0 | 0 | 1 | 0 | 0 | 0 | 0 |
| 8 | 1 | 0 | 0 | 0 | − | + | 0 | 0 | 0 | 1 | 1 | 0 | 0 | 0 | 0 | 0 |
| 9 | 1 | 0 | 0 | 1 | 0 | + | 0 | − | 0 | 0 | 1 | 0 | 0 | 0 | 0 | 1 |
| 10 | 1 | 0 | 1 | 0 | − | + | − | + | 0 | 1 | 1 | 0 | 0 | 1 | 1 | 0 |
| 11 | 1 | 0 | 1 | 1 | 0 | + | − | 0 | 0 | 0 | 1 | 0 | 0 | 1 | 0 | 0 |
| 12 | 1 | 1 | 0 | 0 | − | 0 | + | 0 | 0 | 1 | 0 | 0 | 1 | 0 | 0 | 0 |
| 13 | 1 | 1 | 0 | 1 | 0 | 0 | + | − | 0 | 0 | 0 | 0 | 1 | 0 | 0 | 1 |
| 14 | 1 | 1 | 1 | 0 | − | 0 | 0 | + | 0 | 1 | 0 | 0 | 0 | 0 | 1 | 0 |
| 15 | 1 | 1 | 1 | 1 | + | − | − | + | 1 | 0 | 0 | 1 | 0 | 1 | 1 | 0 |
| FW | | | | | + | + | − | − | 1 | 0 | 1 | 0 | 0 | 1 | 0 | 1 |

| | AB, BC, CD, DA | | | | | | | |
|---|---|---|---|---|---|---|---|---|
| BINARY | 0 | 1 | 1 | 0 | 0 | 0 | 1 | 1 |
| TERNARY | − | | + | | 0 | | 0 | |

INVENTOR.
JOHN S. WHITING
BY
[signature]
ATTORNEY

SPECIAL WORD GENERATOR TABLE

| | $FF_{G1}$ | $FF_{G2}$ | $FF_{G3}$ @ $\phi_5$ | VCT | |
|---|---|---|---|---|---|
| $T_{BR_0}$ | 0 | 0 | 0 | + | FW $FF_{G1}$, $FF_{G2}$ PRESET, 0 0 |
| $T_{BR_1}$ | 1 | 0 | 0 | + | |
| $T_{BR_2}$ | 0 | 1 | 1 | − | DECIMAL 15 $FF_{G1}$, $FF_{G2}$ PRESET, 1 0 |
| $T_{BR_3}$ | 1 | 1 | 1 | − | |
| $T_{BR_4}$ | 0 | 0 | 0 | + | DECIMAL 0 $FF_{G1}$, $FF_{G2}$ PRESET, 1 1 |
| $T_{BR_5}$ | 1 | 0 | 0 | + | |
| $T_{BR_6}$ | 1 | 1 | 1 | − | |

INVENTOR.
JOHN S. WHITING

BY

ATTORNEY

INVENTOR.
JOHN S. WHITING

BY

ATTORNEY

INVENTOR.
JOHN S. WHITING

BY

ATTORNEY

INVENTOR.
JOHN S. WHITING

BY

ATTORNEY

INVENTOR.
JOHN S. WHITING

BY

ATTORNEY

INVENTOR.
JOHN S. WHITING

BY

ATTORNEY

INVENTOR.
JOHN S. WHITING

BY

ATTORNEY

INVENTOR.
JOHN S. WHITING
BY
M. Lukach
ATTORNEY

INVENTOR.
JOHN S. WHITING
BY
ATTORNEY

INFORMATION-HANDLING SYSTEM ESPECIALLY FOR MAGNETIC RECORDING AND REPRODUCING OF DIGITAL DATA

The present invention relates to information-handling systems, and particularly to a system for storage, especially on magnetic records, of digital information with extremely high information storage density on the record medium.

The invention is especially suitable for use in recording of digital data or analog data which is translated into digital form, on magnetic records, such as magnetic tape, for providing extremely high information storage capacity on each track of the record. The invention, however, is also suitable for use in data transmission systems of over a wide variety of transmission mediums, such as communications links. It enables maximum utilization of the available bandwidth.

Magnetic recording is utilized to a large extent for storage of digital information which may be generated in computers, computer peripheral equipment, or other electronic data process equipment. The capacity of the magnetic record for storage of information has been limited by virtue of the techniques utilized for recording and playback of the information to a maximum of about 1,500 bits per inch per track. This limitation has resulted from mechanical deficiencies in the recorder, such as produce timing errors (viz jitter, flutter and skew), and electronic deficiencies, such as the restricted bandwidth of the system, noise, amplitude and variable delays in translation of the data with respect to the record medium both on recording and playback. For example, most recording of digital data is accomplished by saturation of the record medium, at least in one direction. Saturation recording generally requires an appreciable amount of tape to preclude self-erasure effects. Possibly a more significant deficiency of saturation recording is that the bandwidth of the recorded signal extends to DC, thereby limiting the dynamic range of the signal such that very rapidly varying signals, as are required for high-density recording, are unavailable at the head-tape interface. As indicated above, storage capacity is lost in many magnetic recording systems in order to compensate for timing errors, and especially for skew in recording and playback of a multiplicity of parallel tracks.

A system for storage of information as provided by the present invention differs from the aforementioned systems by providing information capacity in a magnetic record or other mediums which is greater by several orders of magnitude than the information storage capacity of such systems. In systems provided in accordance with the invention, the information is converted into a ternary signal. This ternary signal is constituted of sequence of ternary words. Each word contains a plurality of terts. The terts have amplitudes which may be of a positive, negative, or zero level. The amplitude of the terts which constitute each word is zero (viz the sum of the amplitudes of the terts in each word is zero). The ternary signal which is made up of a serial stream of ternary words has spectral properties which closely match the spectral properties of the storage medium (viz the magnetic record-playback process). Specifically, the ternary signal has reduced low-frequency spectral components such that loading of the magnetic heads and other circuits is substantially eliminated. It has a limited bandwidth (viz its spectral response characteristics substantially match the transfer response characteristic of the magnetic-record playback process). Because of its zero average characteristics, the signal has substantially no DC components which are available to load or saturate the tape. The ternary signal also contains timing information, both as to the timing of the terts and the timing of the ternary format words. This timing information uniquely locates the words on playback and permits synchronism thereof, both on a tert-by-tert and word-by-word basis. The timing information in the reproduced ternary signal also permits the recorded information to be translated or decoded back to its original form (say binary code) and facilitates retiming or synchronism with an external clock. Accordingly, even though the ternary information may be subjected to timing errors due to mechanical deficiencies in the recorder system, such errors are compensated and the data may be read out of storage synchronously with an external clock, as may be contained in the data process equipment with which the storage system interfaces. Perhaps the most important advantage of the ternary signal is that it permits the tert-packing density to be twice the bandwidth of the record medium. Thus, for example, a record medium of the type utilizing magnetic tape travelling at 120 inches per second which has band pass extending to somewhat more than 2 MHz. has the capacity of storing bits (one tert per bit) greater than 4 MHz. signal rate. A storage density of 40,000 bits per inch, approximately is obtainable.

A system embodying the invention has a number of components. An encoder is provided for translating input data such as binary coded data, into the ternary signal which may be applied to the magnetic record or other information translation medium. A playback of reproducing system contains a detector for deriving the ternary information from the signal and synchronizers also responsive to the derived ternary signal for obtaining timing signals and synchronizing the reproduced ternary data with respect to the reproduced signals. The synchronizers may also be utilized to detect errors in the reproduced signal which may be caused due to transmission defects, such as dropouts in a magnetic record medium. A decoder is also provided to convert the ternary information into binary form. The playback system may also include a synchronizer or retimer for eliminating timing errors in the reproduced data, as well as reading out the data synchronously with an external clock. Thus, the system is especially suitable for providing a time coherent multichannel data-recording system, as well as being generally applicable to the transmission and reception of digital data.

It is an object of the present invention to provide an improved system for deriving information from an information transmission medium in spite of timing variations in such signals.

It is another object of the present invention to provide an improved system for reproducing data from a record medium in spite of timing variations in the reproduced data.

It is a further object of the present invention to provide an improved system for reproducing data recorded in the form of ternary words having a zero average property in spite of timing errors in the reproduced ternary signal.

It is a still further object of the present invention to provide an improved system for reproducing data from a magnetic record medium which detects errors in such data such as caused by dropouts and prevents erroneous output data from being interpreted as good data.

It is a still further object of the present invention to provide an improved system for synchronously reproducing words of recorded data and rapidly reacquiring synchronism if it is lost due, for example, to transmission loss such as dropouts in the reproduced signals.

It is a still further object of the present invention to provide an improved system for reproducing binary data words T4 in synchronism with corresponding ternary zero average words which are played back from a record medium which utilizes digital logic elements in its implementation and therefore may be fabricated at low cost and with high reliability.

Briefly described, a system provided by the invention provides output data synchronous with successive words of ternary data; the ternary data words being constituted of a certain plurality of terts, the average level of which is zero. A first continuous timing signal at the repetition rate of terts is first derived from the ternary data signal. A second timing signal is then derived by examining successive groups containing the certain plurality of terts which may constitute the ternary words. Errors are detected when the first and second signals are not coincident. Coincidence of the timing signals indicates that a group of terts is in fact a valid ternary word. This valid ternary word may then be decoded into output data, such as a word of binary data.

The invention itself, both as to its organization and method of operation, as well as additional objects and advantages thereof will become more readily apparent from a reading of the following description in connection with the accompanying drawings in which:

FIG. 1 is a block diagram of the recording section of a magnetic recording system which embodies the invention;

FIGS. 2A, 2B and 2C, when taken together as shown in FIG. 2, are a more detailed block diagram showing the elements of the system shown in FIG. 1, which encodes binary data into ternary form for recording on the track of the magnetic record;

FIG. 3A depicting the relationship between the binary and ternary information;

The invention is described herein embodied in a multitrack magnetic recording system using a magnetic tape record. The tape may be driven at 60 inches per second during record operations. Each track then stores data at a rate of $2\times10^6$ bits per second. Playback may be carried on at the same tape speed as used during recording. It is an important feature of the invention, however, that the playback speed may be reduced, say to 3.75 inches per second, in the event that lower output bit rates are needed in order to interface with slower speed data-handling equipment, such as printers. No adjustment is needed in the playback system except, of course, the output clock rate is reduced.

Figures 1, 2:
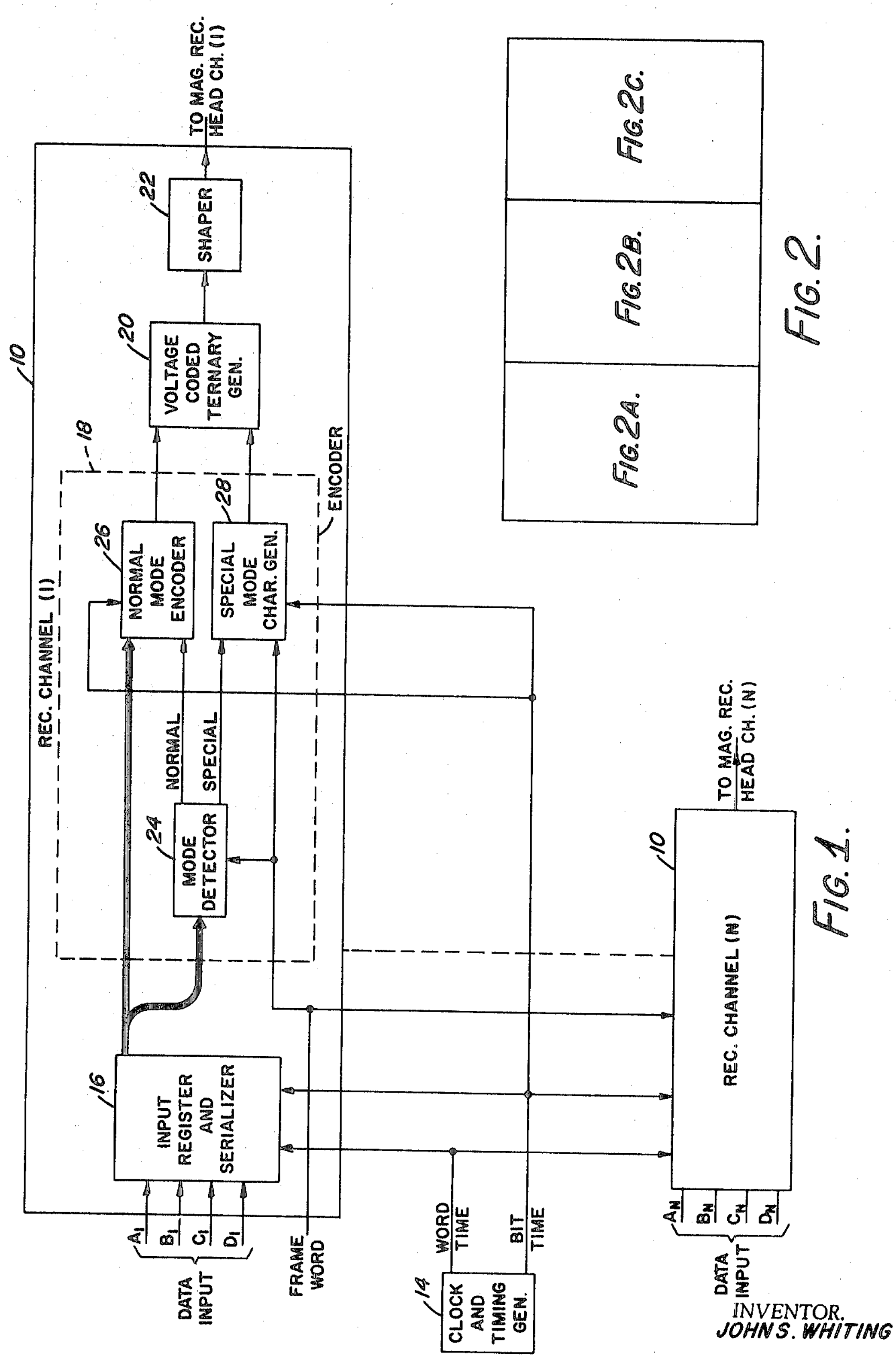
Figure 2A:
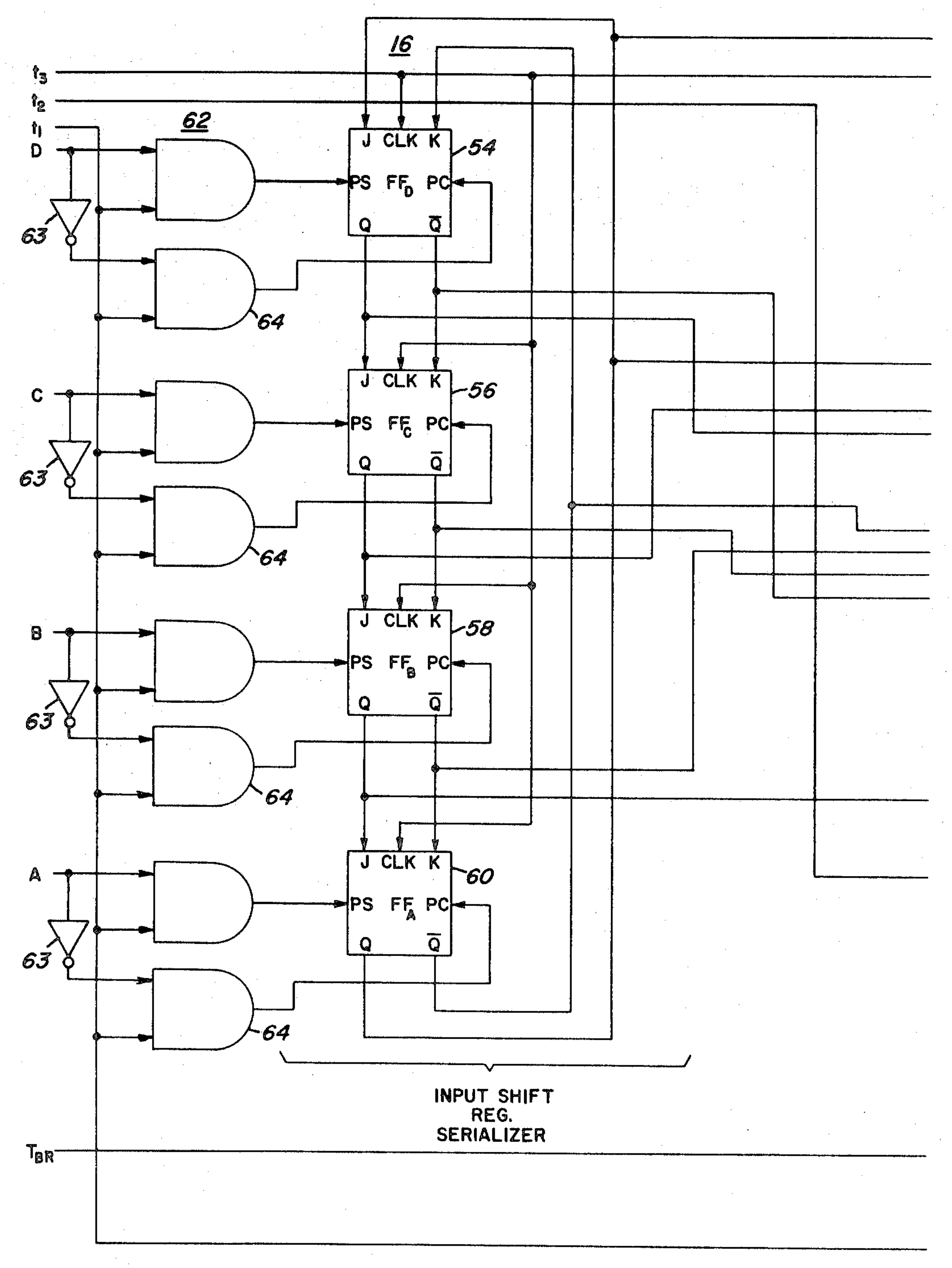
Figure 2B:
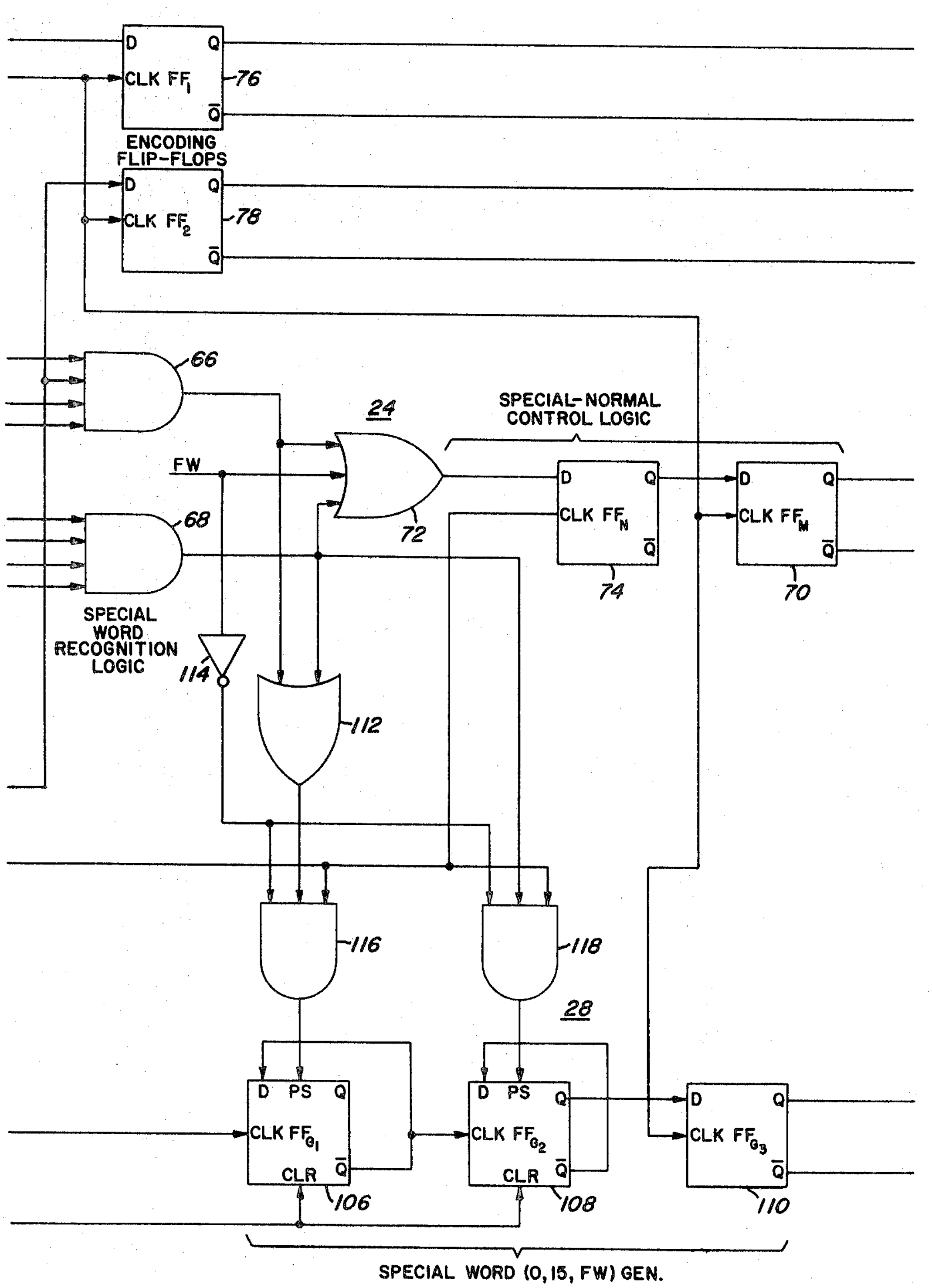
Figure 2C:
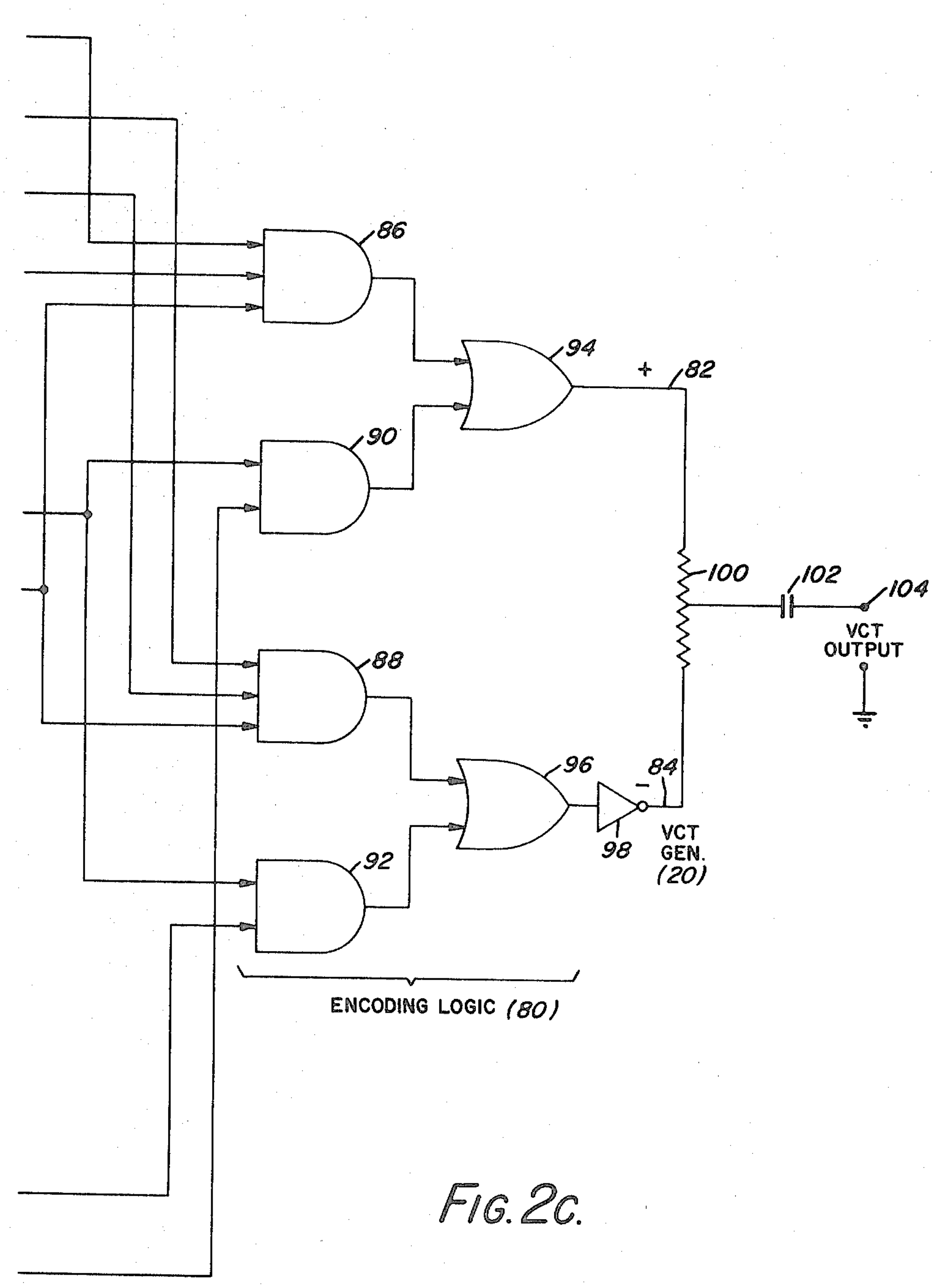
Figures 5, 6:
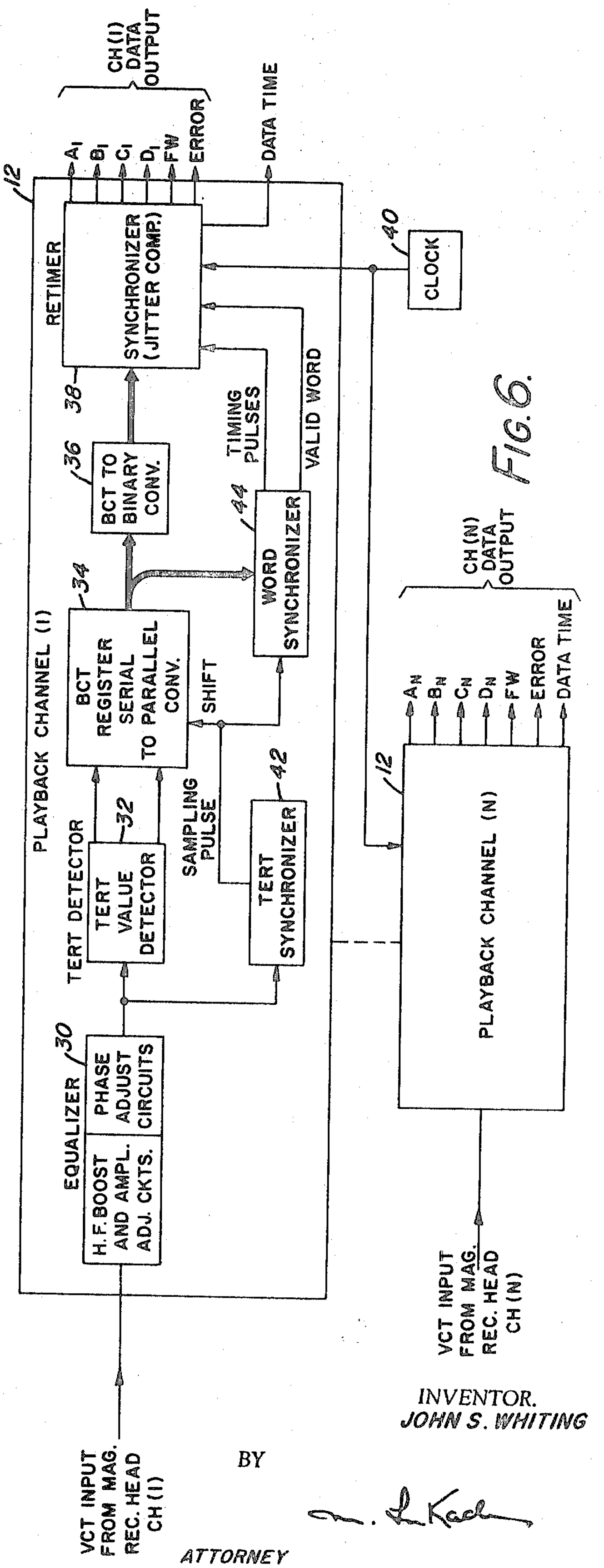
FIG. 5 is a truth table for the special word generator shown in FIGS. 2A, 2B and 2C.
FIG. 6 is a block diagram of a playback section of a magnetic recording system embodying the invention.

The illustrated system receives binary input data in the form of four-bit binary words. This data is translated into ternary form in the recording section of the system and is recorded on the tape as serial ternary words. In the playback section, the ternary signals are derived from the tape and translated back into parallel binary words. The recording section is illustrated in FIG. 1 and the playback section is illustrated in FIG. 6. A recording channel 10 is provided for each track. N recording channels are shown in FIG. 1. EAch recording channel has a complementary playback channel 12. Thus, there are N playback channels, one for each recorded track.

Referring to FIG. 1, the data input to each recording channel 10 is a four-bit binary word constituted of the bits A, B, C, and D. The first channel binary word bits are identified by the subscript 1, while the Nth channel input words are identified by the subscript N. Timing signals for the record channels are provided by a clock and timing generator 14. Both word time clock pulses and bit time clock pulses are provided. For a recording rate of $2\times10^6$ bits per track which corresponds to a tape speed of 60 inches per second, the bit time clock pulses are at a 2 MHz. rate. The word time pulses are at a rate of 500 kHz. since four-bit words are used. Inasmuch as the same clock, which may be a crystal clock 14, is used for all channels, the recording is coherent in each track.

In order to assist in synchronizing the recorded data on playback, a frame word is multiplexed with the input data words. Insertion of a frame word may occur every few hundred data word times and is represented by a timing pulse on the frame word input line.

The first record channel is typical of all N record channels. The data input words are applied to an input register 16 which also serves to translate the data input words into serial form. The words stored in the register 16 are applied to an encoder 18 which translates them into serial binary coded ternary form. Binary coded ternary information is represented by two binary bits for each corresponding input binary bit and for each output ternary bit (herein referred to as a tert). The encoder 18 also converts the frame word pulse into a binary coded ternary frame word. A voltage coded ternary (VCT) generator 20 converts the binary coded ternary information into the ternary signal for recording. The output of the VCT generator 20 may be passed through a shaper 22 prior to being applied to the magnetic head which records the track corresponding to the first channel on the magnetic tape record. The shaper 22 may be a low-pass filter which removes frequency components above about 1.5 MHz. The output waveform for recording is a three-level wave wherein each tert is represented by a positive or negative level which are equal in amplitude or by a zero output level. Each of these levels, positive, negative or zero, has a period equal to one bit time. It may be desirable to apply recording bias say a 75 MHz. AC signal, together with the ternary signal, to the head.

While the input data is in binary four-bit parallel form, the ternary signal which is recorded on the magnetic tape is in the form of serial format words (viz four tert words). These format words are characterized in that the average level (the arithmetic sum of the levels of all four terts) is zero. There are 81 ($3^4$) possible combinations of four three-level terts. Of these 81 possible combinations, 19 have the characteristic of their arithmetic sum being zero. One of these zero average format ternary words contains four zero level terts. This combination is not usable. Of the remaining 18 zero average combinations, 16 are used to represent the 16 different combinations of binary bits which can make up each binary data input word and one ternary zero average combination is used for the frame word.

Figures 3, 3A, 4:
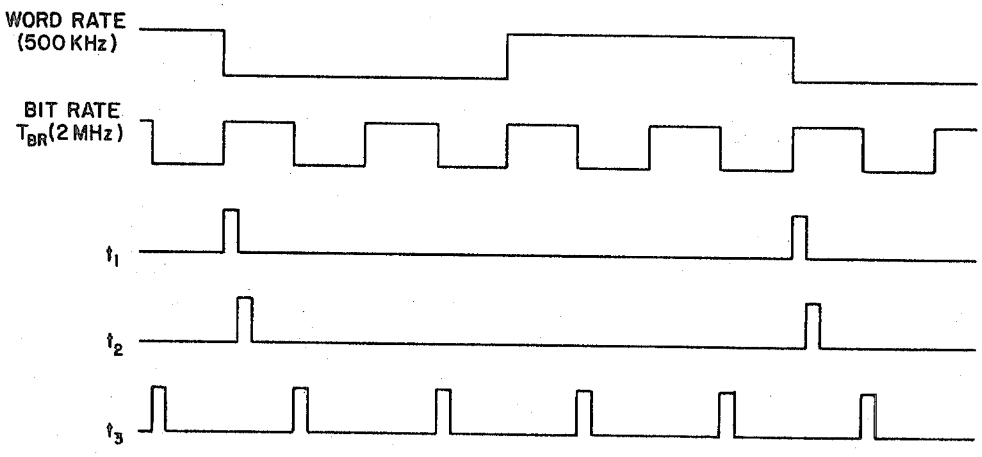
FIGS. 3 and 3A are tables which show the data which is encoded and decoded for purposes of recording and reproduction from the magnetic record in decimal binary voltage coded ternary and binary coded ternary form.
FIG. 4 is a series of waveforms depicting the timing pulses used in the system shown in FIGS. 2A, 2B and 2C.

The encoding/decoding table as shown in FIG. 3 lists the 16 different data input words and the frame word, together with their corresponding ternary and binary coded ternary words. The binary input words corresponding to decimal one to 14 are encoded into ternary form in accordance with the table shown in FIG. 3A, as will be described more fully hereinafter. Encoding in accordance with the table of FIG. 3A is referred to herein as normal mode encoding. The binary words corresponding to decimal zero and 15 and the frame word are encoded specially (i.e. the table shown in FIG. 3A is not applicable thereto). To this end, the encoder 18 includes a mode detector 24 which examines the binary input word stored in the register 16 and provides outputs on a normal output line from the mode detector or on a special output line from the mode detector or on a special output line. The normal output from the mode detector enables a normal mode encoder 26 which operates in accordance with the table shown in FIG. 3A to generate a sequence of binary coded ternary words corresponding to the binary words stored in the input register 16.

When a special binary word (zero of 15 ) is detected, or when a frame word is called for, the special mode character generator 28 is operated to produce the binary coded ternary bits corresponding to the special ternary words which are called for by the mode detector 24. In either case, the binary coded ternary bits are applied to the VCT generator 20 which translates them into the appropriate positive, negative or zero levels for recording.

Inasmuch as the encoder timing is derived from the common clock 14 for all channels 1 through N, the terts and ternary words are recorded coherently (viz simultaneous with the clock pulses) on all N tracks of the magnetic tape record.

The ternary signal which is encoded by the system of each record channel has, as its principal advantage, the ability to be recorded with extremely high packing density. The binary bits are encoded such that there is one tert per bit. The bit packing density is thus twice the frequency cutoff of the record medium. At a record speed of 60 inches per second, the record-playback system, including the head and tape, has a high-frequency cutoff of approximately 1.2 MHz. Recording then can readily be accomplished at a 2 MHz. bit rate, as is used in the herein described illustrative system. This corresponds to a bit-packing density of approximately 33,000 bits per inch. The bit-packing density can be increased to 40,000 bits per inch and yet be compatible with the record-playback process transfer characteristic. The foregoing bit-packing densities are for each recorded track. The total bit-packing density across the tape can be obtained simply by multiplying the bit-packing density per track by the number of tracks which are recorded.

Another feature of the ternary signal is its restricted bandwidth. The signal has minimal low-frequency components, and moreover has no DC component. Thus, loading of the magnetic head is minimal. DC restoration on playback is not required and the response characteristic of the ternary signal is closely matched to the transfer characteristic of the record-playback process.

Inasmuch as the arithmetic sum of the terts reaches zero periodically, each word time, word synchronization is readily accomplished. This word synchronization enables the playback system to provide synchronization, not only with the signal as it is reproduced from the magnetic record, but also facilitates decoding and readout of the played-back data coherently with an external clock. The timing information contained in the encoded signal also facilitates deskewing of signals derived from the separate tracks of a multitrack record, as well as the removal of timing errors, such as jitter, and flutter, which are due to mechanical deficiencies in the magnetic tape transport, as well as dynamic timing errors which arise out of the record playback process.

The first playback channel, as shown in FIG. 6, is typical of all N playback channels. The VCT signal from the magnetic head which scans the track which stores the first channel signals is coupled to an equalizer 30. This equalizer maintains the amplitude and phase (viz envelope delay) essentially constant over the VCT signal bandwidth. The equalizer itself includes high-frequency boost and amplitude-adjusting circuits followed by phase-adjusting circuits which provides envelope delay correction. By way of example, the high-frequency boost circuits may be provided by a tapped delay line, the outputs from the taps of which are combined and applied to an operational amplifier which affords equalization. Following amplitude equalizers are the phase shifters which provide the envelope delay correction. A number of phase shifters may be cascaded to perform this function. Following the phase adjustment circuits, there may be a low-pass filter which removes any unwanted high-frequency noise which is introduced in the record-playback process.

Following the equalizer, the ternary signal is applied to a tert detector, including circuits 32, for determining the value of the terts in the serial stream thereof which is read from the record. The output lines are provided from the tert value detector 32 which assume different levels in accordance with the tert values (viz positive, negative or zero). The levels from the tert value detector are stored in a register 34 in binary coded ternary form. This register has the capacity to store the four terts which make up a ternary word. Thus, as the binary coded ternary information is read out of the register, it is converted into parallel form. A binary coded ternary code converter 36 is provided to decode the BCT information back into its original binary code form. The output data from the converter 36 is applied as parallel binary words to a synchronizer or retiming circuit 38 which removes any jitter or other timing errors and can also provide for skew correction. The binary words are then read out to the utilization device in synchronism with timing pulses from a clock 40 which is common to all the playback channels 12.

The timing information in the ternary signal is used to synchronize the detection of the played-back data, both on a tert and word basis. The tert synchronizer 42 responds to the equalized ternary signal and obtains a timing signal at the tert rate. It is an important feature of the synchronizer that it responds to the fundamental component of the ternary signal which is at the tert rate (2 MHz. for the system illustrated herein), notwithstanding any dropouts on the tape or other short time loss of signal. The timing signals are utilized as sampling pulses for sampling the output of the tert value detector 32 during each tert time, such that the detected values of signal level correspond to the tert values and are stored in the register 34. The timing pulses also shift the VCT information through the register in synchronism with the incoming data so that the register need not be excessively long. A word synchronizer 44 responds to the zero average characteristic of the ternary signal waveform. This zero average characteristic is contained in the BCT data word stored in the register 34. The word synchronizer thus compares the zero average word times with expected word times as connoted by the occurrence of the number of tert times (four in the illustrated system) and recognizes word synchronism by the coincidence of the periodically occurring zero average values with every fourth tert time.

Circuits are included in the word synchronizer 44 for rapidly reacquiring synchronization if it is lost, say due to dropouts or other timing errors. The word synchronizer also produces outputs indicating valid words frame word and word time. These timing pulses are applied to the retiming synchronizer 38 so as to properly enter the decoded binary data therein and to operate the synchronizer so as to remove any timing errors and provide output data in synchronism and coherence with the clock 40. An important feature of the invention is that the timing information is derived by the synchronizers 42 and 44 without the need for any pilot signal which would waste bandwidth if contained in the data signal itself, or bit-packing density if a separate timing track were utilized.

Figure 17:
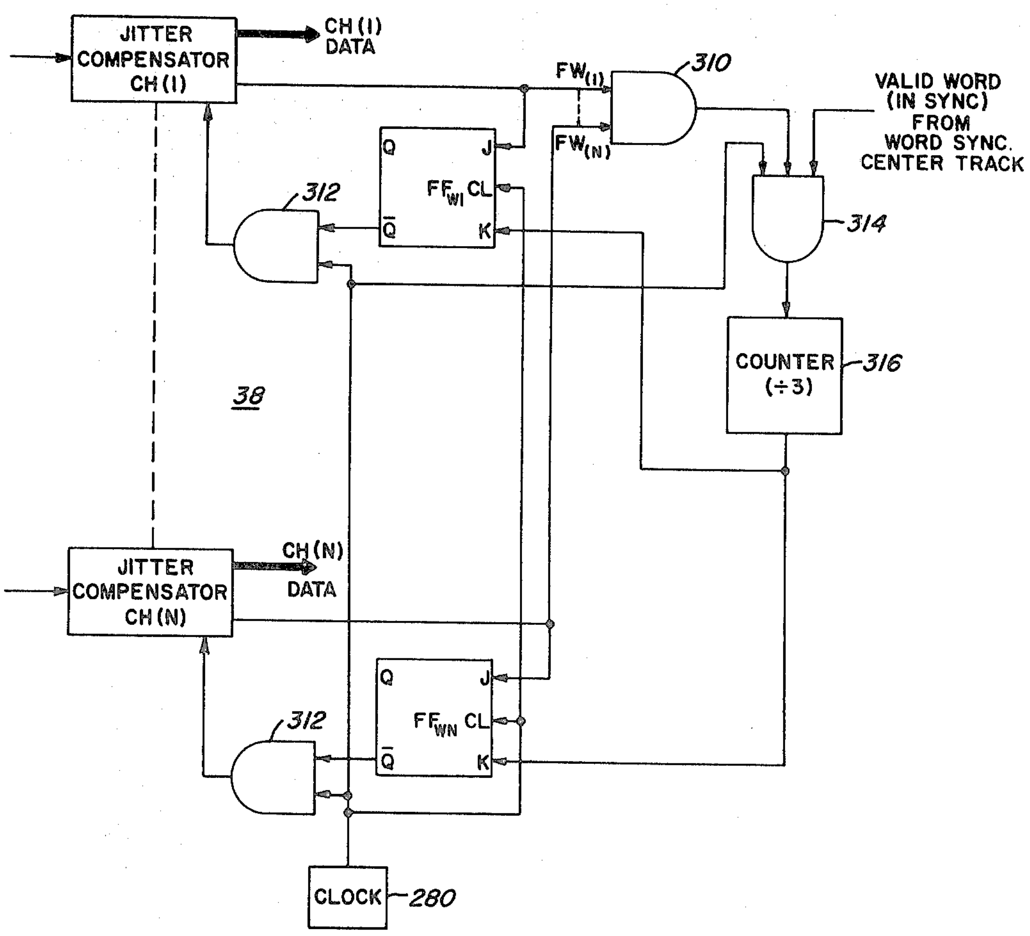
FIG. 17 is a block diagram of the system including the retiming synchronizer for eliminating skew from the data reproduced from the channels or tracks on the magnetic record.

Circuitry may be provided with cooperates with the synchronizers 38 and may be contained therein, for deskewing, the data derived from each of the several N tracks. Accordingly, all of the parallel binary words $A_1$, $B_1$, $C_1$, $D_1$ through $A_N$, $B_N$, $C_N$, $D_N$ are all provided at the output of the system in synchronism with each other and coherently with the clock 40. The skew compensation circuitry will be described in greater detail hereinafter in connection with FIG. 17.

Figure 18:
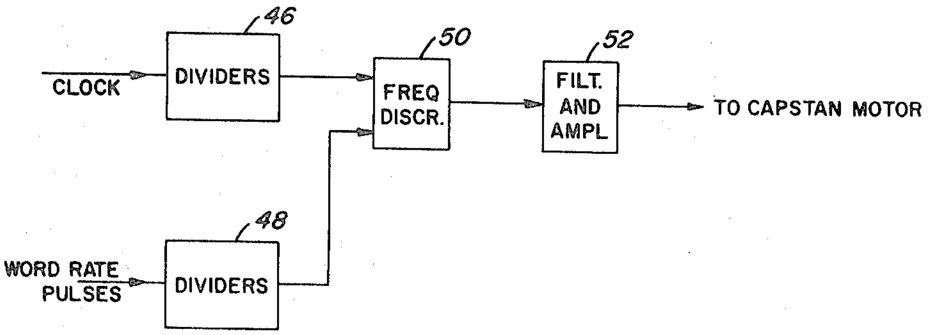
FIG. 18 is a block diagram of the system for controlling capstan speed in the recorder associated with the playback system shown in FIG. 6.

As shown in FIG. 18, the word rate pulses, say as obtained from the word timing pulse output line of the word synchronizer 44 for the center or N/2 track may be used to provide magnetic record (tape speed) control during playback. The pulses from the clock 40, as well as the word rate pulses are applied to dividers 46, 48, such as divide by N counters. The divided signals are then applied to a phase discriminator 50 which may be a set-reset flip-flop; the flip-flop being set by divider 46 output and reset by the divider 48 output. The direct current amplitude of the output signal from the discriminator 50 is then a function of the variation of tape speed from constant speed. A filter and amplifier circuit 52 derives the DC value or error signal and uses it to control the capstan motor of the tape transport or such other speed control device as is used for record speed control. This system is effective in substantially eliminating low-frequency (below 10 Hz.) tape speed variations. The synchronizers in the playback section are effective to eliminate higher frequency timing errors such as are introduced by mechanical deficiencies of the tape and its transport or other record drive mechanism. As noted above, electrical timing errors, are also eliminated by the synchronizer systems.

Referring now to FIGS. 2A, 2B and 2C, 3, 3A and 4, a typical record channel is shown in greater detail. The inputs to the channel are the four-bit binary words, A, B, C and D and the timing pulses from the clock 14. These timing pulses are illustrated in FIG. 4. The uppermost waveform shows the word rate or word time pulse train which is a square wave repetitive at 500 KHz. The next waveform shows bit rate or bit time pulses $T_{BR}$. It is a square wave at the 2 MHz. bit rate. Note that there are four cycles of the bit rate pulse train during each word time. The timing pulses $t_1$ and $t_2$ occur at the beginning of each word time; $t_1$ occurring just before $t_2$ at the beginning of the first bit time of each word. The timing pulses $t_3$ occur at the center of each bit time. Suitable counters and logic circuits in the clock and timing generator 14 are provided to produce the various timing pulses shown in FIG. 4. Another input pulse is frame word (FW). This frame word signal is a level having a duration of one complete word time. It may be produced by the system (e.g. a multiplexer) which provides the input data.

The data words are inputed to the flip-flop stages 54, 56, 58 and 60 of the register 16 via AND-gates 62 and 64 which are enabled at the beginning of each word time by the $t_1$ timing pulse. The flip-flop stages 54 to 60 are JK flip-flops of the type which are operated by positive levels and pulses. Thus, when a positive level is applied at the output of an AND-gate 62, the level representing a binary "1" bit, the flip-flop will be set. When a level representing a binary "0" bit is present, that level is inverted in the inverters 63 and applied via gates 64 to the appropriate PC flip-flop input such that the flip-flop will be reset to store a binary "0" bit. The flip-flop stages 54 to 60 of the register 16 are connected in tandem. The last register stage 60 is connected to the first stage 54. Inasmuch as the bit rate timing pulses $t_3$ are applied to the clock inputs of each of the flip-flops 54 to 60, the data will circulate around the register. Upon occurrence of each bit rate timing pulse $t_3$, the data advances between adjacent pairs of register stages and from the last stage 60 to the first 54. The shifting of the data in the register is utilized to serialize the data as it is encoded into its ultimate VCT form.

Special word recognition logic, including a pair of AND-gates 66 and 68, forms part of the mode detector 24 and detects binary words corresponding to decimal, zero and 15 (see FIG. 3). The gate 66 detects the all "1" words corresponding to decimal 15, while gate 68 detects the all "0" words corresponding to decimal zero.

The data stored in the register 16 are examined at the beginning of each word time and a mode control flip-flop 70 ($FF_M$) is set, if the data word represents decimal zero (as indicated by an output from the AND-gate 68), decimal 15 (as indicated by an output from the AND-gate 66), or frame word. To this end, the frame word input line and the output lines from the gates 66 and are applied to an OR-gate 72. Flip-flop 74 ($FF_N$) is set at the beginning of each word time by the word time timing pulse $t_2$ which is applied to the clock input thereof, if a binary one bit represented by the presence of the special word (zero, 15 or FW) is forwarded by the OR-gate 72. The bit stored in the $FF_N$ is transferred to the mode control flip-flop 70 ($FF_M$) by the next hit time pulse $t_3$. Thus, flip-flop $FF_N$ stores information as to whether a normal or special (zero, 15 or FW) has occurred and the mode control flip-flop $FF_M$ then stores information as to whether the binary word is special or normal for the entire word time. Two flip-flops 70 and 74 are used in the special-normal control logic in order to accommodate any delays in the operation of the register flip-flops 54 to 60. The flip-flops 70 and 74, and the other flip-flops shown in the drawings which are similarly labeled, may be D-type flip-flops, such as type SN7474 which are operated by positive pulses.

A pair of flip-flops FF1 and FF2, also indicated by reference numerals 76 and 78, are provided for normal mode encoding of the binary data stored in the register 16 to serial binary coded ternary data. The bit of the binary word which is stored in the $FF_A$ stage 60 is transferred to $FF_1$ each bit time by the timing pulse $t_3$ which is applied to the clock input of this $FF_1$ flip-flop 76. At the same time, the bit which is stored in $FF_B$ is transferred into the $FF_2$ flip-flop 78. These encoding flip-flops therefore store values of adjacent pairs of bits during each bit time. In the first bit time, bit A is stored in $FF_1$ while bit B is stored in $FF_2$. On the second bit time, the data circulates (bit B being stored in $FF_A$ and bit C being stored in $FF_B$). Thus, at the second bit time, the encoding flip-flops store bits B and C. Again, in the next bit time, the bits are circulated such that the adjacent pair of bits C and D are now stored in $FF_A$ and $FF_B$ and transferred into flip-flops $FF_1$ and $FF_2$. Finally, the last bit time finds the D bit in $FF_A$ and the A bit in $FF_B$. Thus the adjacent pairs of bits AB, BC, CD and DA are successively stored in the encoding flip-flops 76 and 78 during the four successively stored in the encoding flip-flops 76 and 78 during the four successive bit times which occur during each word time.

These bits are encoded into the terts of a ternary word on a tert-for-bit basis in accordance with the encoding table shown in FIG. 3A. The resulting ternary words which correspond to decimal words one through 14 are listed in the encoding/decoding table of FIG. 3. The encoding logic 80 translates the binary information as to the values of these adjacent pairs of bits which are stored in the flip-flops 76 and 78 into the binary coded ternary form on a pair of output lines 82 and 84. These output lines are indicated by a plus and a minus for purposes of explaining the operation of the VCT generator 20 which translates the output into the voltage coded ternary signal.

The encoding logic utilizes four AND-gates 86, 88, 90 and 92. The gates 86 and 88 are enabled during normal mode encoding by virtue of the flip-flop 70 being reset. The gates 90 and 92 operated during encoding of the special words zero and 15 and FW and are enabled only when the mode-controlled flip-flop 70 is set.

When the first of the adjacent pairs of bits is "1" and the second is "0," $FF_1$ will be set and $FF_2$ will be reset. AND-gate 86 will then be enabled and a "1" bit will be transferred via the OR-gate 94 to the pulse line 82. When the second of the pair of adjacent bits is "1" and the first is "0," the gate 88 will be enabled and the OR-gate 96 will transfer a "1" bit to the minus output line 84, via an inverter 98.

Consider that the output levels produced by the logic elements are plus 6 volts to represent a "1" and 0 volts to represent a "0" bit. Accordingly, when the first of the adjacent pairs of bits is "1" and the second "0," the plus output line 82 will be a plus 6 volts, and, by virtue of the inverter 98, the minus output line 84 will also be at plus 6 volts. The output voltage at the center tape of the resistor 100 of the VCT generator 20 will then be a plus 6 volts, during the bit time when the adjacent pair of bits transferred to the encoding flip-flops 76 and 78 is "1," "0."

On the other hand, when the adjacent pair of bits is "0," "1 " the AND-gate 86 will not be enabled. Thus, the plus output line 82 will be at 0 volts. Although the gate 88 is enabled, the inverter 96 causes the minus output line 84 also to be at 0 volts. The center tape of the resistor 100 will therefore be at 0 volts during the time interval where the adjacent pairs of bits are "0," "1. " In all other cases where the adjacent pairs of bits are "0""0" or "1""1" neither of the gates 86 or 88 will be at plus 6 volts while the plus output line 82 remains at 0 volts. The resistor 100 then acts as a voltage divider and half of the output voltages or 3 volts appears at the center tap. The VCT generator however includes a capacitor 102 connected between the center tap of the resistor 100 and the output thereof. Inasmuch as the ternary signal has no DC component, the average value of the signal derived at the output terminal 104 of the generator 20 will be 3 volts. Thus the voltage coded ternary signal at the output 104 will be a tert of zero level when the adjacent pairs of bits are "0""0" and "1""1" and a tert of positive or negative level of plus or minus 3 volts for the "1""0" and "0""1" combination of adjacent pair of bits. The truth table for the foregoing operation of the encoding logic and VCT generator 20, is shown in FIG. 3A. An important feature of the encoder is that it automatically provides ternary words having zero average level by sequential processing of the adjacent pairs of bits of each data input word.

The special words zero, 15 and FW are assigned ternary counterparts as shown in the table of FIG. 3. One ternary combination ——++ is not presently used. However, it may readily be encoded by means of the special word generator and used for example as an alternate frame word or to identify binary input words having bad parity.

The special word generator 28 utilizes a two-bit counter made up of $FF_{G1}$ and $FF_{G2}$ flip-flops 106 and 108. This counter is clocked by the bit rate pulses $T_{BR}$.

The states of the flip-flops 106 and 108 on six successive bit rate pulses $T_{BRO}$ through $T_{BR6}$ are listed in the special word generator table shown in FIG. 5. The value of the bits stored in $FF_{G2}$ is transferred to a special word encoding flip-flop 110 also designated as $FF_{G3}$ at the middle of each bit time by the $t_3$ timing pulses. During each bit time, when the mode control flip-flop $FF_M$ in the special-normal control logic is set the bits stored in $FF_{G3}$ will be transferred via AND-gates 90 and 92 and OR-gates 94 and 96 to the plus output line 82 and the minus output line 84 of the VCT generator 20. With the special encoding flip-flop 110 set the output of the inverter 98 and the output of the OR-gate 94 will be both at low level thereby providing a negative VCT tert. The converse is true when the special encoding flip-flop 110 is reset. Then a positive voltage level is produced by the VCT generator at the output 104.

In order to provide a proper sequence of outputs from the last flip-flop stage 108 of the counter, the counter stages 106 and 108 are both preset at the beginning of the word time for the special word. As shown in the table of FIG. 5, the preset is (a) to "0""0" when the frame word is to be generated, (b) to "1""0" for the decimal 15 word, and (c) to "1""1" for the decimal zero word. To this end the outputs of the AND-gates 66 and 68 in the special word recognition logic, and the frame word are applied to the preset input of the flip-flops 106 and 108, via an OR-gate 112, an inverter 114 and via a pair of AND-gates 116 and 118. The AND-gates 116 and 118 are enabled every word time by the timing pulse $t_2$. The AND-gates 116 and 118 are inhibited if frame word occurs. The flip-flops 106 and 108 are preset to "zero" at the beginning of each word time by the $t_1$ timing pulse. AND-gates 116 and 118 are inhibited upon occurrence of a frame word by inverter 114. Frame word effectively presets both flip-flops 106 and 108 to "0." Thus the sequence of terts ++—— will be produced during the frame word time.

When the binary word corresponding to decimal 15 is recognized by the AND-gate 66, the output level is transferred via the OR-gate 112 to the AND-gate 116. This gate is enabled by the $t_2$ word time and presets the first flip-flop 106. The second flip-flop 108 remains reset; accordingly, the counter is preset to "1""0" and the sequence of output terts +——+ representing the special word 15 is generated by the VCT generator 20 during the word time for the special word.

For the special word corresponding to decimal zero, the AND-gate 68 output is transferred via the OR-gate 112 to the AND-gate 116, and, as well, directly to the AND-gate 118. Thus, upon occurrence of the late word timing pulse $t_2$, both flip-flops 106 and 108 are preset to "1" and the sequence of output terts —++— is generated during the four tert times during which the special word corresponding to decimal zero exists.

The VCT output at the terminal 104 is applied to the shaper 22 (FIG. 1).

Figure 7:
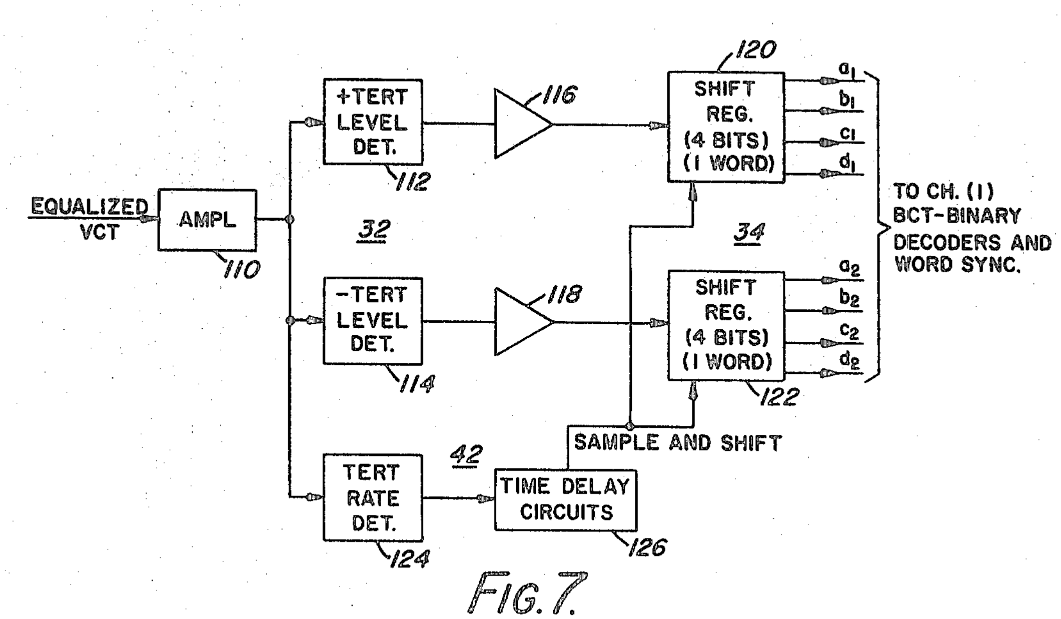
FIG. 7 is a block diagram showing the tert detector of the system shown in FIG. 6.

The playback section was described generally in connection with FIG. 6. Referring to FIG. 7, the tert detectors 32 and the tert synchronizer 42 are shown in somewhat greater detail. The equalized voltage coded ternary signal is fed via a buffer amplifier 110, which may be part of the equalizer to a positive tert level detector 112 and a negative tert level detector 114. After buffering in buffer amplifiers 116 and 118 the tert level detector outputs are entered into a pair of shift registers 120 and 122 which constitute the registers 34 (FIG. 6). By virtue of the separation of the terts into plus and minus tert streams, the data are translated back into binary coded ternary form at the register inputs.

Entry of the data into the registers 120 and 122 occurs at the times when the reproduced terts are at their peak values. In other words, the output of the constantly changing terts produced by the tert level detectors 112 and 114 is sampled at the tert rate when the tert level detectors are at about their peak values (viz about the center of each tert time). The tert sampling pulses are produced by the tert synchronizer 42 which includes a tert rate detector 124. Time delay circuits 126 provide suitable settling time to assure that the binary coded ternary data is entered synchronously with the terts as they are played back from the record when the detected terts are at peak value. The registers 120 and 122 have the capacity to store four bits or one word of binary coded ternary information.

In the operation of the system four successive binary coded ternary bits will be stored in the register 120 and 122. This information is utilized to detect the zero average condition and thereby locate the recorded zero average ternary format words. Timing information is thereby obtained from the recorded ternary signal both as to the location of the recorded terts and the location of the ternary words. Synchronization on a tert-by-tert basis and then on a word-by-word basis is therefore obtainable by essentially digital techniques. Thus although coherence with the fixed clock which was present on recording will be lost due to time delays in the record playback process, timing information is derived as to the location of the terts and the words from the signal itself such that the reproduced data is coherent with the signal derived from the tape.

Figure 8:
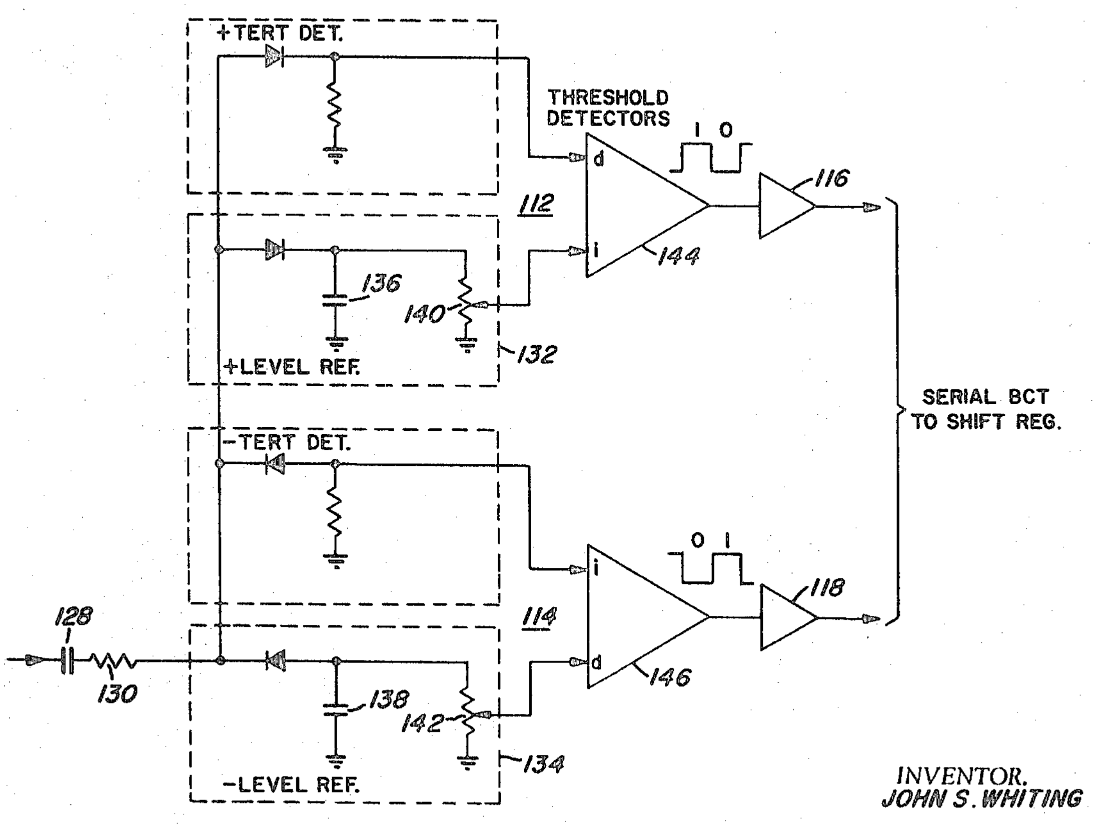
FIG. 8 is a circuit diagram illustrating the tert level detectors shown in FIG. 7 in greater detail.

The tert detectors 112 and 114 circuits are shown in FIG. 8. The ternary signal is coupled to the tert detector via a capacitor 128 and a resistor 130 which assure that any DC component is blocked. Oppositely polarized diodes separate the positive and the negative signals. The positive signals go to the plus tert level detector 112 and the negative signals (with respect to ground) go to the minus tert detector 114.

In order to accommodate amplitude variations, two floating reference levels are obtained by means of a positive reference level detector 132 in the plus tert detector 112 and a negative reference level detector 134 in the negative tert detector 114. The diodes, in these reference level detectors, continuously detect the level or amplitude of the ternary data when such data are positive or negative and store the amplitude in capacitors 136 and 138. The time constant of the circuits including the capacitors is made long with respect to the tert and ternary word rates, but fast enough to follow long-term amplitude changes. A time constant of at least 10 word times is suitable. Potentiometers 140 and 142 in the reference level detectors 132 and 134 provide the reference levels for threshold detectors which are in the form of comparators 144 and 146. A reference level of approximately one-half the levels stored across the capacitors 136 and 138 is suitable. Inasmuch as the positive reference level detector 132 output is applied to the inverting input of the threshold 144, the threshold detector 144 will provide a positive level when the ternary signal input level is positive and above the reference level. When the ternary signal level is positive, the direct input to the comparator 146 will not be exceeded by the inverting input thereto so that a zero output level representing a "0" bit will be produced. Thus for a positive tert the threshold detectors will provide "1" and "0" bits on the separate output lines to the BCT registers 120 and 122. The ternary data is therefore converted by means of the tert detectors 32 into BCT form; "1""0" in BCT representing a positive tert. Similarly when a negative tert is detected, the inverting input of the comparator 146 will be lower than the direct reference level input to the amplifier 146, and an input level representing a "1" bit will be produced by the threshold detector comparator 146. Zero level ternary data will result in a pair of "0" bits at the output of the threshold detectors. These voltage levels pass through the buffer amplifiers 116 and 118 and are supplied to the input of the BCT registers 120 and 122 in a manner to be described more fully hereinafter in connection with FIG. 11. The data stored in the registers 120 and 122 during operation is in the form of eight binary coded ternary bits, $a1, a2, b1, b2, c1, c2, d1, a2$.

Figure 9:
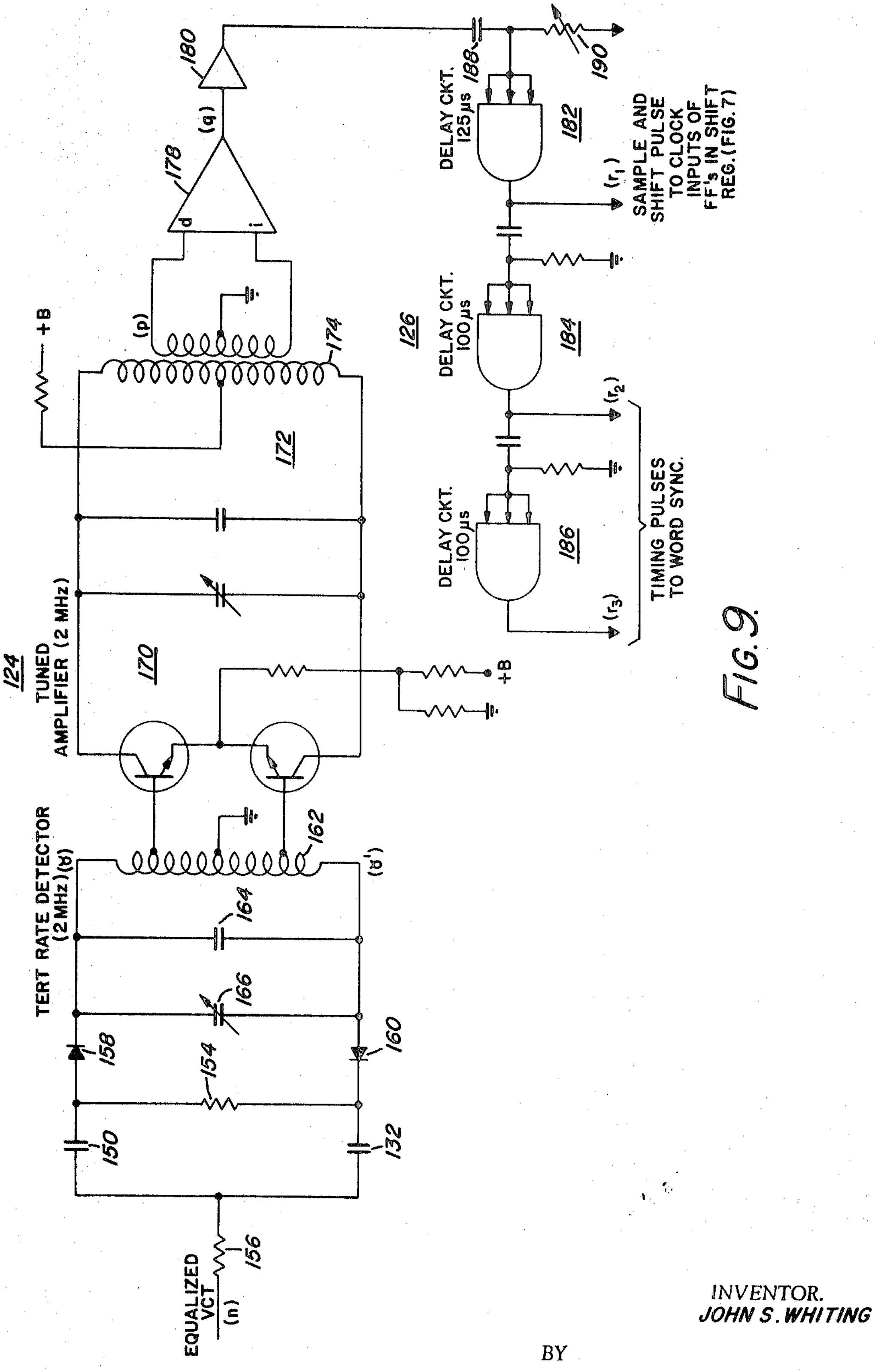
FIG. 9 is a circuit diagram of the tert rate detector shown in FIG. 7; this detector providing timing signals coherent with the reproduced terts and at the tert rate.

The circuitry of the tert rate detector 124 and its associated time delay circuits 126 is shown in FIG. 9. Briefly, the tert rate detector operates by extracting the fundamental frequency component of the ternary signal which is at the tert rate (2 MHz.) in a manner whereby the low-frequency and DC components in a peak detected ternary signal do not overload the circuit. It has been found that the tert rate component if the VCT signal is approximately 25 to 30 db. above the other components in the signal after rectification. However, this component is significant with respect to the total signal when the peaks of the signal, both positive and negative, are detected. In order to prevent loss of the component, and therefore loss of tert synchronization in the presence of dropouts or other transmission losses, the tert rate detector desirably has memory to continue to provide a tert rate output in spite of short term loss of the reproduced ternary signal. Suitable memory period may for example to be 10 word times. Direct full wave detection of the ternary signal to extract the tert rate component is not entirely suitable since the DC components of the rectified signal would block a detector responsive to the high-frequency tert rate component.

The tert rate detector itself includes the circuits for matching the impedance of the equalizer to a peak detector circuit which includes a tank circuit responsive to the fundamental AC tert rate component. Following the tank circuit is a tuned amplifier which filters and amplifies the detective tert rate components. THereafter the timing pulses are obtained from the zero crossings of the fundamental tert rate component in a slicing circuit.

THe tank circuit includes a coil or inductor 162 shunted by a capacitor 164. A trimmer capacitor 166 forms a part of the capacitance of the tank circuit and is also connected across the inductor 162. The Q of the tank circuit is sufficient to maintain the output at the tert rate for a period of time even if the input signals thereto are lost, approximately 10 word times being suitable. The peak detector includes a pair of diodes 158 and 160 passing the positive and negative peaks of the ternary signals to the tank circuit. In order to assure that only the peaks of the signal are detected, capacitors 150 and 152 are in series with the source resistor 156 and the diodes. These capacitors prevent DC loading of the tank circuit. The capacitors 150 and 152 charge when their associated diode conduct. This charge develops a voltage which is stored in capacitors 150 and 152 and effectively back biases the diodes and assures that only a small portion, approximately 35 percent, of the energy which is at the peaks of the ternary signal is applied to the tank circuit.

A balanced tuned amplifier 170 may be connected to taps on the inductor 162 for providing more selectivity than the tank circuit to the tert rate detector. The tank circuit 172 of this amplifier includes an output transformer 174 which drives a level detector 178. This level detector slices the output sine wave from the tuned amplifier 170 and provides a square wave of sufficient amplitude to drive the time delay circuits 126. The edges of this square wave are coincident with the zero crossings of the AC tert rate component prior to being applied to the delay circuits 126. The square wave is passed through a buffer amplifier 180. It will be noted that the balanced tuned amplifier in its resulting output square wave timing signal.

Figure 10:
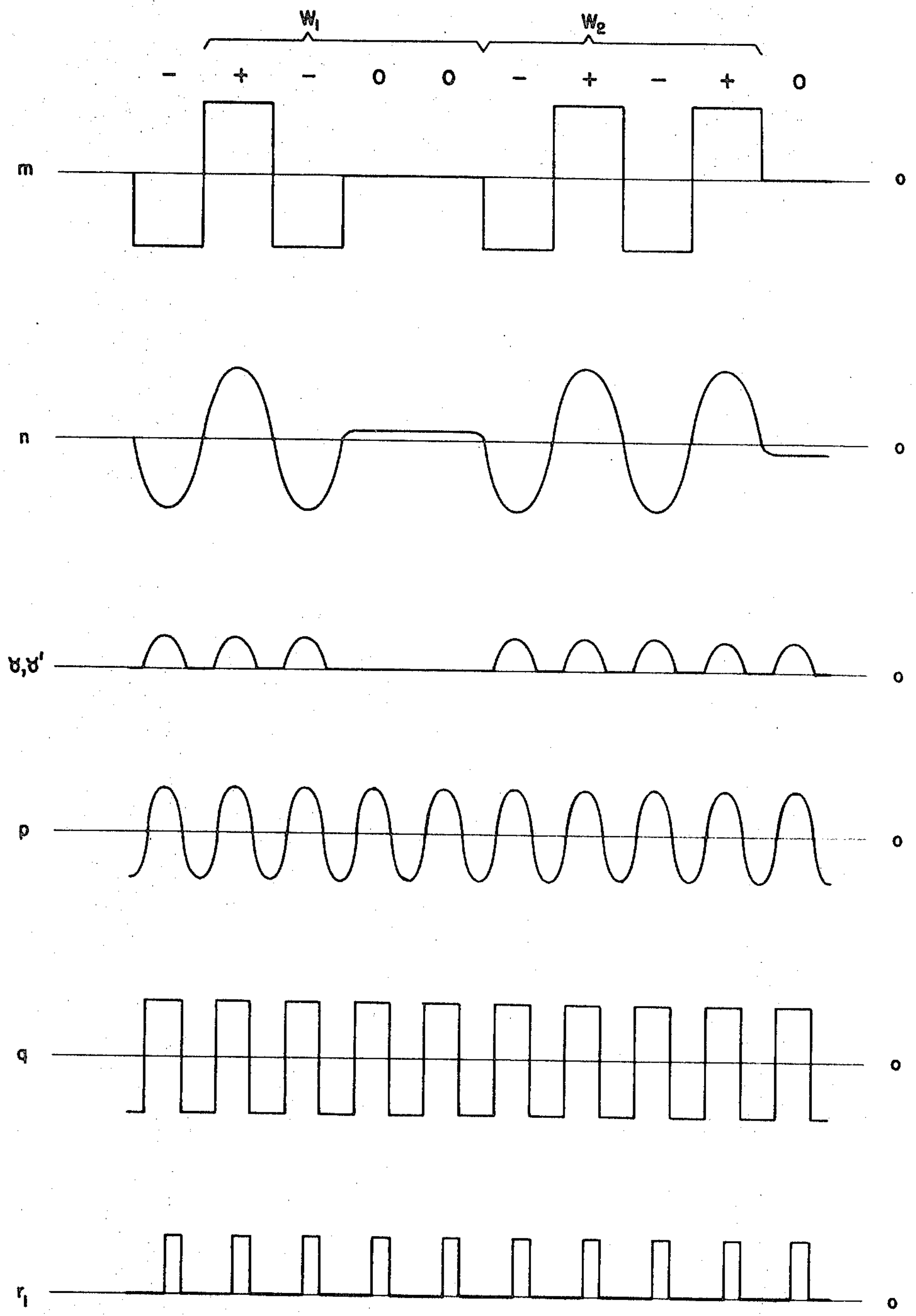
FIG. 10 is a series of waveforms which illustrate the operation of the circuit shown in FIG. 1.

A typical ternary signal is shown in waveform *m* of FIG. 10. This is the signal which is recorded on the magnetic record. Two zero average ternary words $W_1$and $W_2$ are shown in waveform. When this recorded word is played back the reproduced signal is essentially the time derivative thereof because of the action of the magnetic reproducing or playback process. The playback signal is shown in waveform *n*. The peak detected signals, which are applied to opposite ends of the tank circuits, as shown in FIG. 9, are $\gamma, \gamma'$. These signals are effectively combined by being applied to opposite ends of the tank circuit. The tank circuit develops an AC component at the fundamental rate of these signals. The fact that the no signals $\gamma, \gamma'$ occur during some dropouts or zero VCT levels does not prevent the tank circuit from developing the fundamental AC component. This component is at the 2 MHz rate and is illustrated in waveform *p*. Waveform *p* is the waveform produced by the tuned amplifier as well as by the tank circuit. The slicer operational amplifier 178 responds to the balanced (180° out of phase) outputs which appear at the opposite ends of the secondary winding of the transformer 174 and produces a sharply defined square wave, which has edges coincident with the zero crossings of the AC component wave *p*. The square wave is shown as waveform *q*.

The delay circuits provide a sequence of timing pulses $r_1$, $r_2$ and $r_3$, the timing pulse $r_1$ being shown in FIG. 10. The delay circuits include a plurality of cascade-connected individual delay circuits three of which, 182, 184 and 186, are shown. These circuits include an RC network 188, which in the case of the first delay circuit 182, may have a variable resistor 190 for trimming purposes. Each delay circuit has its own AND-gate used as an inverting amplifier. The input of the AND-gates are connected in common to the junction between the resistor and the capacitor of its RC input network. The negative-going or trailing edge of the square wave output of amplifier 180, will cause a positive output to be generated at the output of delay amplifier gate 182. Capacitor 188 will begin charging to supply current to the input of gate 182, and after a time dependent on the value of capacitor 188 and resistor 190 will no longer supply sufficient current to gate 182. This will cause the output pulse of gate 182 to fall to its original value this completing the delay period.

Figure 12:
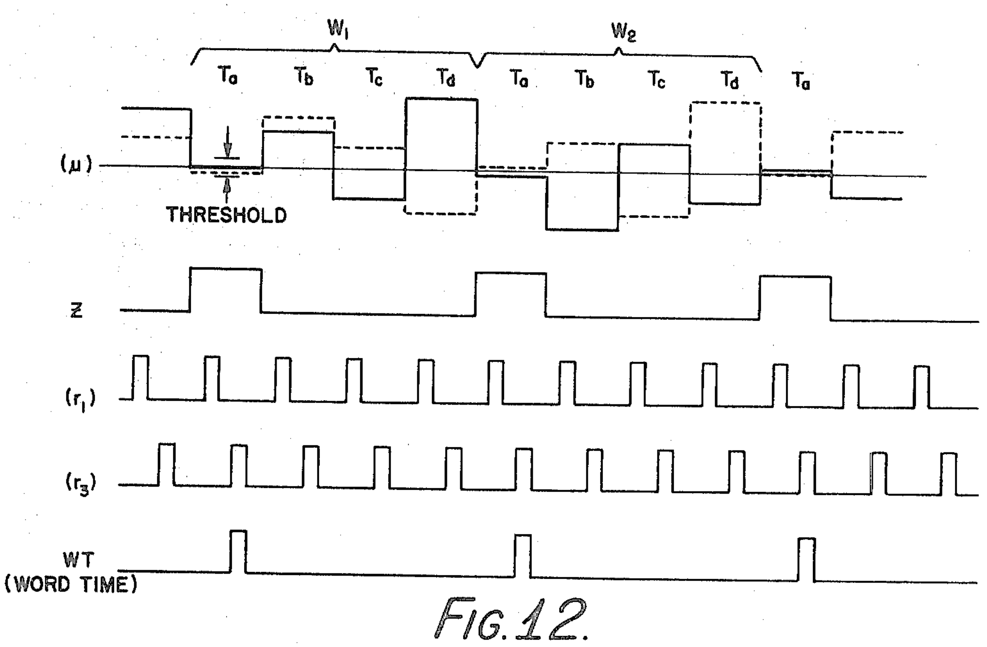
FIG. 12 is a series of waveforms which illustrate the operation of the system shown in FIG. 11.

In like manner, the trailing edge of the pulse from gate 182 will initiate the delay pulse output of delay gate 184, followed in turn by delay output pulse of gate 186. The time constants of the RC networks at the inputs of the AND-gates in the succeeding delay circuits 184 and 186 may suitably be selected such that the pulses $r_1$and $r_3$ are generated after successive 100 microsecond delays. At a 2 MHz. tert rate each tert time is 500microseconds in duration. Accordingly, the last timing pulse $r_3$ will occur towards the end of the tert time. The second $r_2$ approximately in the middle, and the first timing pulse $r_1$ towards the beginning of each tert time. Thus timing pulses are available to accommodate settling times of the circuits and components of the system where necessary. The relative location of the $r_1$ and $r_3$ timing pulses with respect to tert times is shown in FIG. 12, which will be discussed in greater detail hereinafter.

Figure 11:
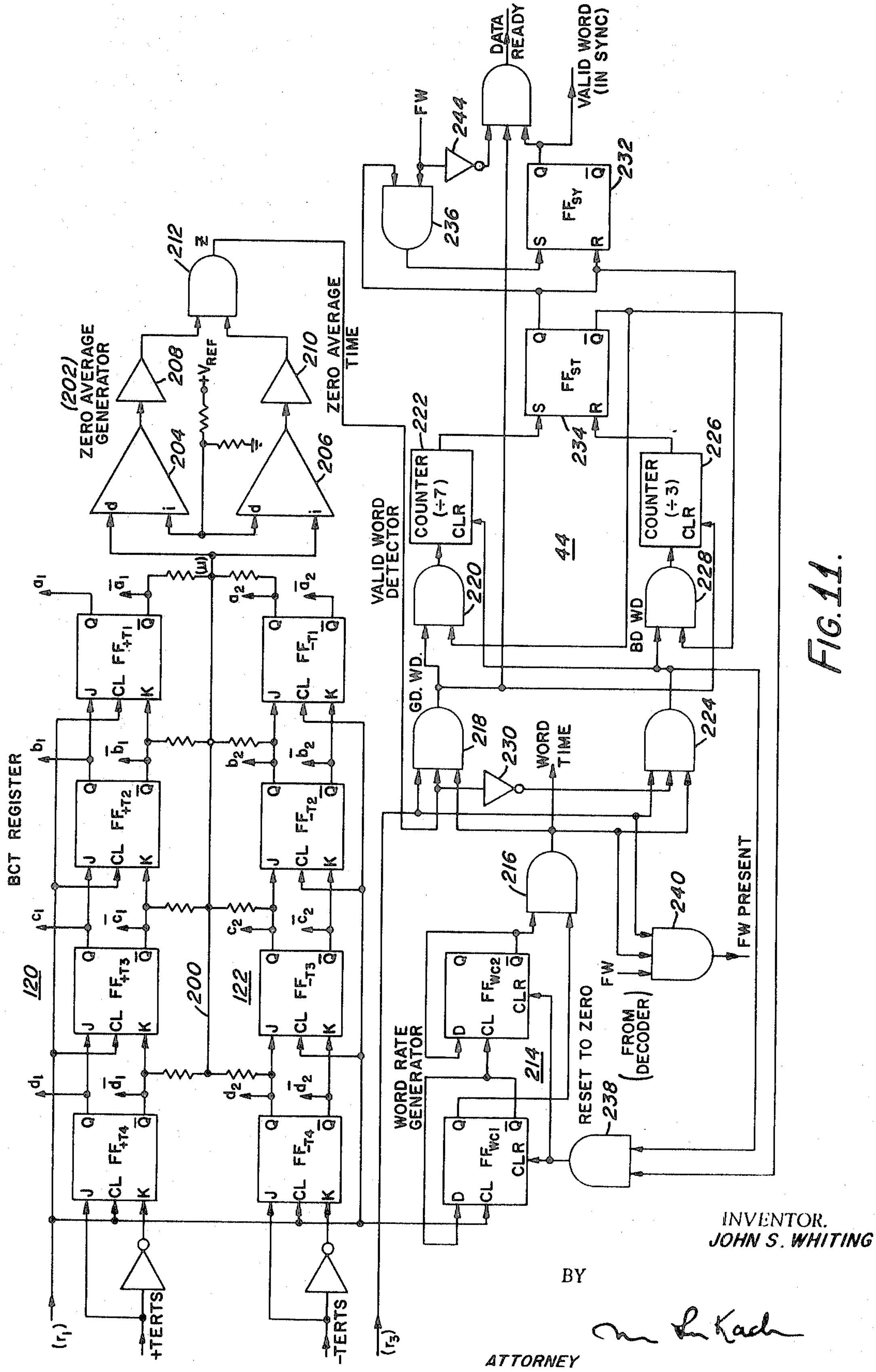
FIG. 11 is a block diagram which illustrates the word synchronizer and binary coded ternary word register of a playback channel as shown in FIG. 6.

The shift registers 120 and 122 which constitute the BCT register are shown in greater detail in FIG. 11. This figure also shows the word synchronizer 44, which was described generally in connection with FIG. 6. Each of the registers 120 is a shift register consisting of four tandem connected flip-flops of the JK type. The register 120 includes $FF_{+T1}$, $FF_{+T2}$, $FF_{+T3}$, $FF_{+T4}$. The other shift register handles the negative terts and the flip-flops of this register are identified as $FF_{1T1}$, $FF_{1T2}$, $FF_{1T3}$, and $FF_{1T4}$. The earliest occuring of the bits of binary code ternary information $a_1$, $a_2$ are stored in the last register stages $FFFF_{+T1}$ and $FF_{1T1}$ and the bits $b_1$, $b_2$, $c_1$, $c_1$, and $d_1$, $d_2$are stored in the subsequent register stages. Ternary information corresponding to the plus and minus terts, which is binary coded ternary form by virtue of the operation of the tert detectors 112 and 114 (FIG. 7 and FIG. 8), is entered into the flip-flop stages $FF_{+T4}$ and $FF_{1T4}$ respectively. Entry of these pulses results when a tert rate timing pulse $r_1$ is applied to the clock input of these flip-flop stages $FF_{+T4}$ and $FF_{1T4}$. Since the tert rate timing pulses $r_1$ are also applied to the clock inputs of the other flip-flop stages, the data is advanced between adjacent stages upon occurrence of each of these early timing pulses $r_1$.

Words synchronization is predicated upon occurrence of the zero average when a valid binary coded ternary word is present in registers 120 and 122. Four bits in binary coded ternary form are stored in the register each tert time only. Once during each of the ternary word times (viz every four times) is it a valid word. In order to detect this valid word, the binary coded ternary information is translated into analog form by the ladder network 200 constituted of resistors connected to the $\bar{Q}$ outputs of the flip-flop stages in the register 120 and the Q output of the flip-flop stages in the register 122. The output level which is the sum of levels at the Q and $\bar{Q}$ outputs of the flip-flop is shown for two conditions by the solid and dash lines in waveform $\mu$of FIG. 12. The levels vary from one tert time to another. However, in word time $T_a$ the zero average condition always exists. This condition is detected by a zero average generator 202 provided by a pair of operational amplifiers 204 and 206. The operational amplifier 204 detects whether or not the summation of the Q and $\bar{Q}$ output voltages is above a given threshold, while the amplifier 206 detects whether that voltage is below the threshold. The threshold is illustrated as the region between the arrows in waveform $\mu$of FIG. 12. When the output levels from the amplifiers are both positive, this is an indication that neither the positive nor the negative threshold has been exceeded. Accordingly, and AND-gate 212 is enabled and produces an output pulse, the Z pulses (in FIG. 12) during the zero average tert time. This output pulse is applied to the word synchronizer 44.

The word synchronizer 44 also receives an input from a word rate generator 214. This generator is a divide-by-four counter having two flip-flops $FF_{WC1}$ and $FF_{WC2}$. An AND-gate 216 is enabled when a count of one is stored in the counter ($FF_{WC1}$ is set and $FF_{WC2}$ is reset). This condition will occur every four tert times, inasmuch as the input to the first counter stage $FF_{WC1}$ is the early $r_1$ timing pulse. The output of the AND-gate 216 is taken as the word time pulse (viz the time when a ternary word coded in accordance with the table set forth in FIG. 3 is stored in the registers 120 and 122). This condition is not valid, however, unless the ternary word stored in the register is a zero average word. The latter condition, of course, occurs only during the zero average time. Thus, word synchronization exists when the word time and the zero average time occur simultaneously (viz the Z pulses and the WT pulses are coincident). THis condition of word synchronization is taken to represent a good word if it, in fact, occurs, or a bad word if it does not occur.

A good word (GD.WD.) is detected by an AND-gate 218 to which the word time and the zero average time pulses are applied. If. at the time of occurrence of the late timing pulse $r_3$ from the bit rate detector delay circuits 126 (FIG. 9), there is a coincident condition of the word time and zero average time pulses, a GD.WD. output pulse is passed by the AND-gate 218 and is applied via another AND-gate 220 to a good word counter 222. On the other hand, if the zero average time Z pulse is not coincident with the word time WT pulse (FIG. 12) as an AND-gate 224 is enabled upon occurrence of the late timing pulse $r_3$ and a BD.WD. output pulse representing a bad word is applied to a bad word counter 226 via an AND-gate 228 when that gate is enabled. The inverter 230 permits the bad word detection gate 224 to be enabled when the Z pulse is not coincident with the word time pulse. As indicated above, all of these pulses are illustrated in the waveforms of FIG. 12.

THe word synchronizer also includes a sync flip-flop 232 also indicated as the $FF_{SY}$ flip-flop, which is set to represent a valid word ("in sync" condition) when a status flip-flop 234 also indicated as $FF_{ST}$ is set and frame word FW has occurred. Assuming that the status flip-flop 234 is reset, representing an out-of-sync condition, a count of seven good words without an intervening bad word causes the status flip-flop 234 to be set. Since the bad word output from the AND-gate 224 is applied to the clear input of the counter 222, it is cleared or reset by each bad word. However, if seven good words are counted, the status flip-flop is not reset to bad word status until three successive bad words, without an intervening good word, are counted by the counter 226. Note that the good word pulse is applied to clear or reset the bad word counter 226.

When the status flip-flop 234 is set to good word status, the next frame word enables an AND-gate 236 and sets the sync flip-flop 232. Thus, if synchronism is lost, it will not be recovered until a frame word is detected. This is desirable because the data words which are recorded may be multiplexed and represent data from different sources. Their position relative to the frame word indicates their source. Thus, synchronism also indicates that the position of the words relative to each other is maintained. It will be noted that the AND-gate 220 is enabled only if bad words status is stored in the status flip-flop 234, while the AND-gate 228 is enabled when the good word status is stored in the flip-flop 234. The word synchronizer therefore is adapted to detect changes in word synchronism caused for example by incorrect interpretation of the data by the logic of the system, tape dropouts or other transmission errors, as usually prevent playback of properly formatted words.

In order to reacquire synchronism rapidly, the word rate generator is operated in a search mode when the system is out of sync and the status flip-flop 234 registers bad word status. At that time, an AND-gate 238 is enabled to pass bad word pulses to the clear inputs of the flip-flops $FF_{WC1}$ and $FF_{WC2}$ of the word rate generator 214. Each bad word then causes the word rate generator to count back one (viz from a count of four) represented by a "1""0" condition of the flip-flop $FF_{WC1}$ and $FF_{WC2}$ respectively to a "0""0" condition which is one step or count back from the count when a word time pulse is produced. Thus, word time (WT) pulses pulses will be produced at each tert time following the detection of a bad word. This enables synchronization to be reacquired very rapidly.

An AND-gate 240 provides a frame word present output pulse synchronously with the late $r_3$ timing pulse. The frame word input to the AND-gate 230 is obtained from the decoder which will be described more fully hereinafter in connection with FIG. 13. The system which utilizes the data played back from the tape is also provided with a data ready pulse by means of an AND-gate 242 which is enabled when the system is in sync, as indicated by the set state of the sync flip-flop 232, the occurrence of a good word pulse and the absence of frame word. The latter is indicated when the output of an inverter 244, to which the frame word output from the decoder is applied, represents a binary "1" bit. Thus, the word synchronizer provides a valid word output from the sync flip-flop 232 which indicates that word produced by the channel are valid. The absence of a valid word output indicates that the data is in error and may be taken as an error output for the purpose of operating an alarm say if a given number of bad words are detected in a given interval of time. The data ready pulse is an indication of the time when the valid data is ready and may be taken from the decoder for the channel.

Figure 13:
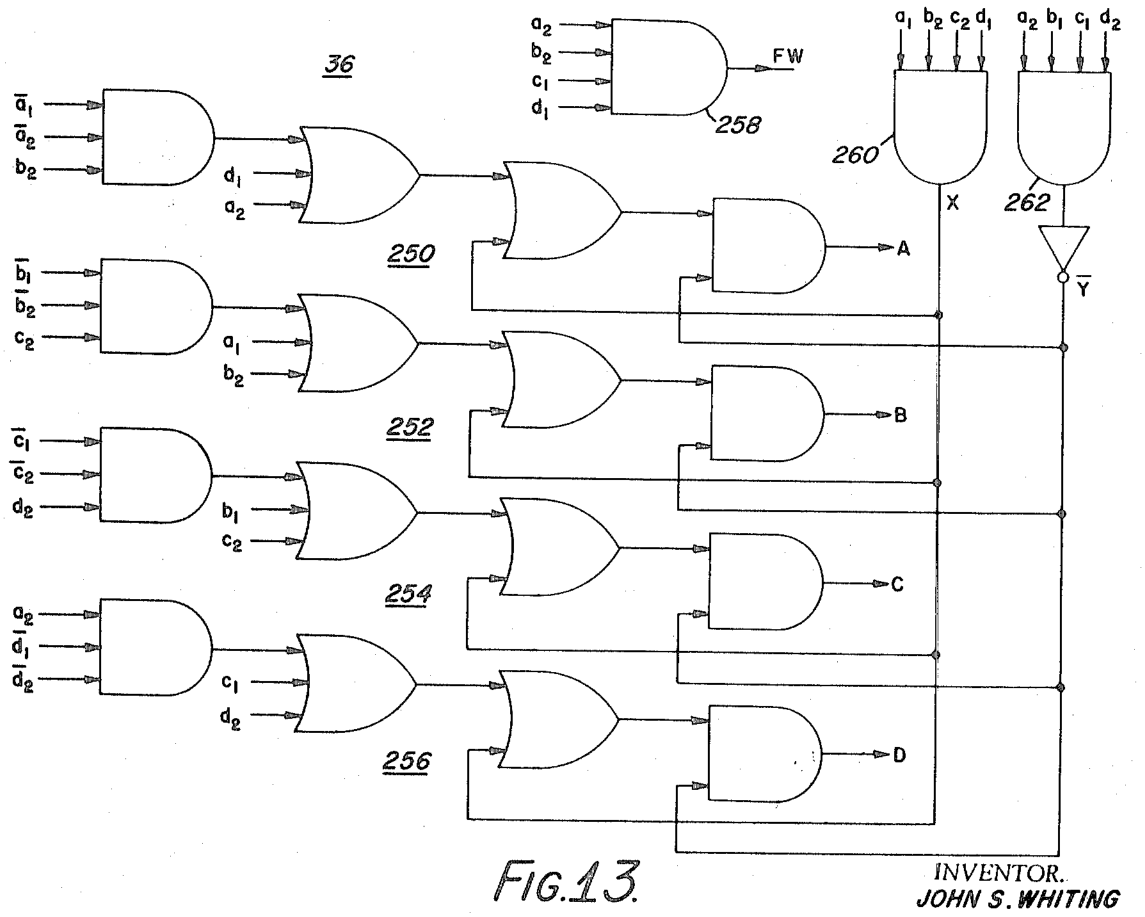
FIG. 13 is a logic diagram of the binary coded ternary to binary code converter shown in FIG. 6.

The binary coded ternary to binary coded converter 36 of the playback section is shown in FIG. 13. The simplicity of the decoder and its facility to decode the transmitted ternary signal is a result of the storage of the ternary signal in binary coded ternary form in the BCT registers 120 and 122 (FIG. 11). It will be noted that each of the stages of these registers provides the BCT bits $a_1$, $a_2$, $b_1$, $b_2$; $c_1c_2$, $d_1$, $d_2$and the complements thereof. When a valid word is stored in the registers, as identified by the word synchronizer 44, valid binary data will be provided by the decoder 36.

The decoder has four channels, special 252, 254, and 256 which respectively decode and convert the BCT data into the corresponding binary bits A, B, C and D of the binary word. The decoder also has an AND-gate 258 which is enabled when frame word is stored in the registers 120 and 122. A pair of AND-gates 260 and 262 provide bits X and Y respectively, when the two special words decimal zero, in the case of gate 262, and decimal 15, in the case of the gate 260, are stored in the register 120 and 122. The operation of the digital logic gates in each of the channels 250 through 256 will be apparent from the following truth table for the decoder. The truth table also prevents the Boolean equation upon which each of the channels of the decoder operates to decode its respective bits.

TRUTH TABLE-DECODER

| | | | | | | | | | | |
|---|---|---|---|---|---|---|---|---|---|---|
| A="1" in Decimal | | | 1 | 3 | 5 | 7 | 9 | 11 | 13 | 15 |
| $T_4$=+ | $d_1$="1" | | 1 | 3 | 5 | 7 | | | | |
| $T_1$=− | $a_2$="1" | | 1 | | 5 | | 9 | | 13 | |
| $T_1$=O<br>$T_2$=− | $a_1$="O", $a_2$="O"<br>$b_2$="1" | | | 3 | | | | 11 | | |
| X="1" (special) | | | | | | | | | | 15 |

$$A=(a_2+d_1+\bar{a}_1\bar{a}_2b_2+X)\bar{Y}$$

| | | | | | | | | | | |
|---|---|---|---|---|---|---|---|---|---|---|
| B="1" in Decimal | | | 2 | 3 | 6 | 7 | 10 | 11 | 14 | 15 |
| $T_1$=+ | $a_1$="1" | | 2 | | 6 | | 10 | | 14 | |
| $T_2$=− | $b_2$="1" | | 2 | 3 | | | 10 | 11 | | 15 |
| $T_3$=−<br>$T_2$=O | $c_2$="1"<br>$b_1$="O", $b_2$=O | | | | 6 | 7 | | | | |
| X="1" (special) | | | | | | | | | | 15 |

$$B=(a_1+b_2+c_2\bar{b}_1\bar{b}_2+X)\bar{Y}$$

| | | | | | | | | | | |
|---|---|---|---|---|---|---|---|---|---|---|
| C="1" in Decimal | | | 4 | 5 | 6 | 7 | 12 | 13 | 14 | 15 |
| $T_2$=+ | $b_1$="1" | 0 | 4 | 5 | | | 12 | 13 | | |
| $T_3$=− | $c_2$"1" | | 4 | 5 | 6 | 7 | | | | 15 |
| $T_3$=O<br>$T_4$=− | $c_1$="0", $c_2$="0"<br>$d_2$=1 | | | | | | 12 | | 14 | |
| X="1" (special) | | | | | | | | | | 15 |

$$C=(b_1+c_2+\bar{c}_1\bar{c}_2d_2+X)\bar{Y}$$

| | | | | | | | | | | |
|---|---|---|---|---|---|---|---|---|---|---|
| D="1" in Decimal | | | 8 | 9 | 10 | 11 | 12 | 13 | 14 | 15 |
| $T_3$=+ | $c_1$="1" | 0 | 8 | 9 | 10 | 11 | | | | |
| $T_4$=− | $d_2$="1" | 0 | 8 | | 10 | | 12 | | 14 | |
| $T_4$=0<br>$T_1$=1 | $d_1$="0", $d_2$="0"<br>$a_2$="1" | | | 9 | | | | 13 | | |
| X="1" (special) | | | | | | | | | | |

$$D=(c_1+d_2+\bar{d}_1\bar{d}_2a_2+X)\bar{Y}$$

Consider channel 250. It will be apparent from FIG. 3 that the binary bit A is a binary "1" in the case of the decimal words 1, 3, 5, 7, 9, 11, 13 and 15. The BCT bits which uniquely identify these decimals words and the terts corresponding thereto are listed in the second through fourth line of the decoder truth table which is presented above. Since the bit A is "1" also in the case of the special decimal 15 word, the bit X as derived by the gate 260 must also be considered in deriving the A bit. The digital logic gates of channel 250 respond to the X bit and the binary coded ternary bits which are necessary and sufficient to identify the A bit. It will be appreciated, of course, that other forms of digital logic, such as utilize NAND gates may also be implemented to decode these bits of the binary word A, B, C and D.

Figure 14:
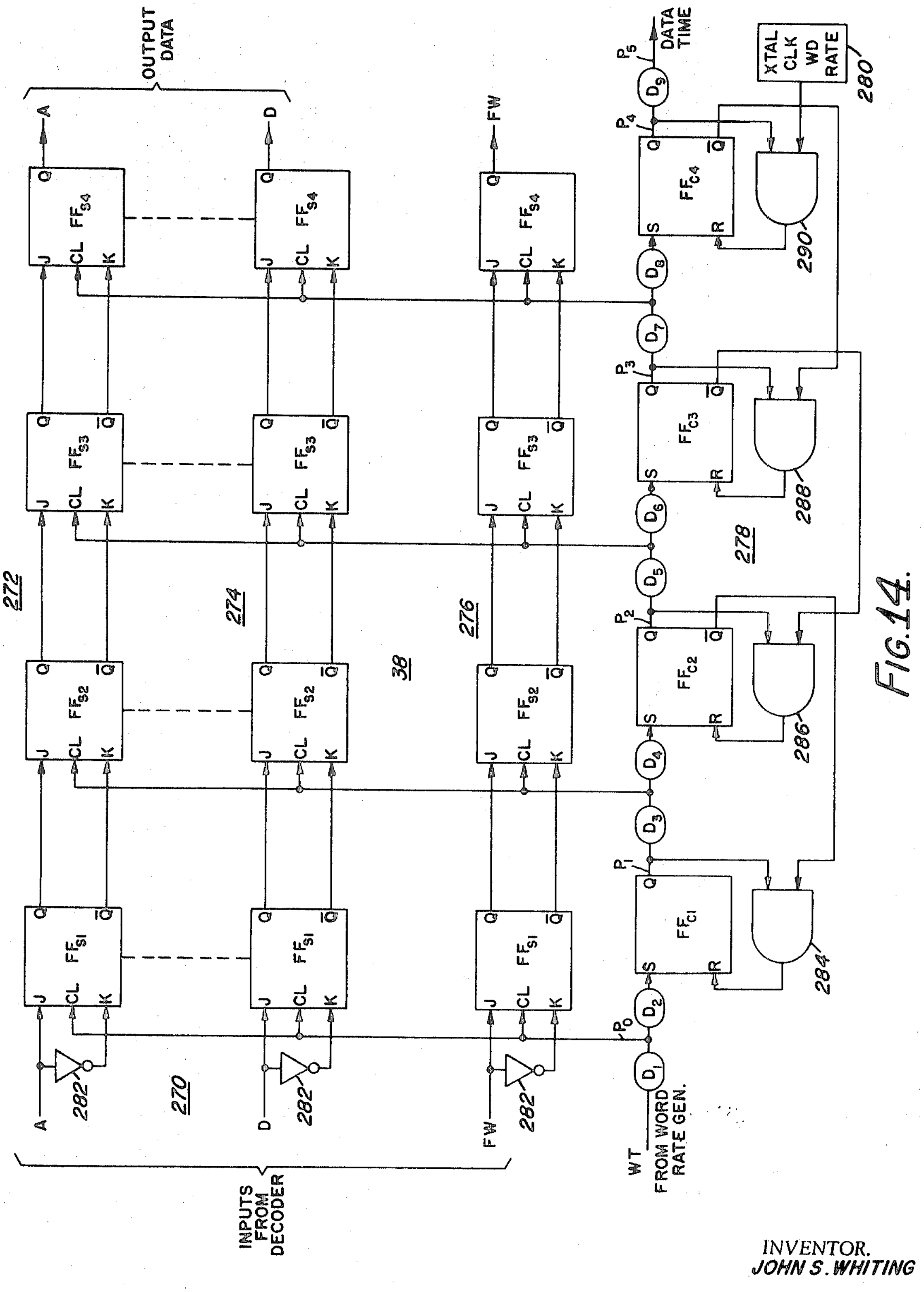
FIG. 14 is a block diagram of the retimer synchronizer which provides output data from each channel of the playback channels shown in FIG. 6.

Inasmuch as the word time (viz the occurrence of the zero average time Z pulses) may not be stable in time and may jitter, due for example to mechanical or electrical deficiencies in the recording system, a synchronizer or retimer 38 (FIG. 6) is provided to compensate for the jitter and such other timing errors as may be introduced by the system. This synchronizer is partially shown in detail in FIG. 14. The operation of the synchronizer or retimer will also be more apparent from the waveforms of FIG. 15. The synchronizer includes a register section 270 to which the binary bits A through D and the binary bit representing frame word (FW) are applied. Capacity in the register may also be provided for storing a binary bit representing bad word, if desired, in order to provide for self-testing of the system. Only the registers 272 and 274 which are provided for the first and last bits A and D of the binary word are shown in the drawing to simplify the illustration. The drawing also shows the register 276 for the frame word bit. The synchronizer 38 has as its other principal section a timing pulse generator 278 which provides timing pulses $P_O$, $P_1$, $P_2$, $P_3$, $P_4$ and $P_5$, which are utilized to shift the data bits corresponding to different words of the data through the register, such that when they are stored in the last stages of the registers and are read out synchronously with the last or data time pulse $P_5$ the pulses for each word are in synchronism with each other and with a constant frequency clock signal. This clock signal is at the word rate and is produced by a crystal clock source 280 (viz a crystal oscillator) and suitable pulse-shaping circuitry which provides the word rate clock pulses.

The generator 278 has four flip-flop stages $FF_{C1}$, $FF_{C2}$, $FF_{C3}$ and $FF_{C4}$ each corresponding to a successive register stage. While the registers each have four flip-flop stages $FF_{S1}$ through $FF_{S4}$ the additional stages and additional corresponding flip-flop stages in the generator 278 may be provided, if timing errors of longer duration are introduced by the particular tape drive mechanism which is used in the system. Each of the register flip-flop stages are JK flip-flops of the type which are actuated by positive pulses. Thus, inverters 282 are provided for resetting the first stage flip-flop $FF_{S1}$ when the input binary bits are "0" bits.

Figure 15:
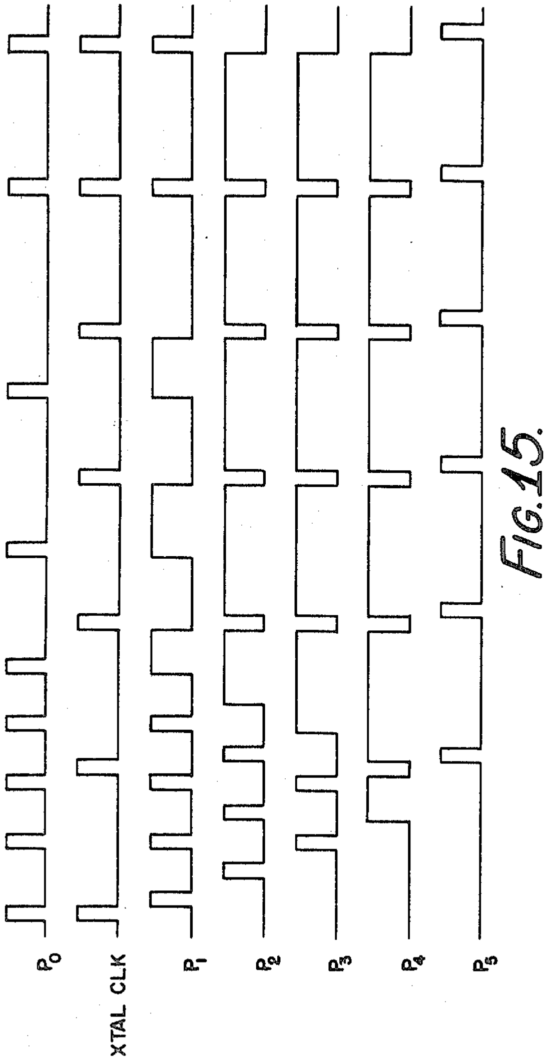
FIG. 15 is a series of waveforms which are illustrative of the operation of the system shown in FIG. 14.

Consider the operation of the synchronizer system when the rate of the word time pulses varies as represented by the variation in rate of the $P_0$ pulses as shown in FIG. 15. The $P_0$ pulses correspond to the word time pulses; a short delay being provided in the delay circuit $D_1$ in order to accommodate settling time in the registers and in the decoder logic. The variation in word time rate is readily apparent with respect to the constant word rate crystal clock pulses will be apparent from FIG. 15.

The $P_0$ pulses enter the first data word into the first stage flip-flops $FF_{S1}$ of the registers 272 through 276. After a slight delay in the delay circuit $D_2$ to accommodate the storage of the first data word in the register's first stages $FF_{S1}$, the first flip-flop $FF_{C1}$ in the pulse generator 278 is set. All of the delays produced by the delay circuits $D_1$ through $D_9$ are much less than one word time, approximately 90–100 microseconds being a suitable delay for the 2 MHz. bit rate system described herein. When the generator flip-flop $FF_{C1}$ is set, this connotes that the first stages $FF_{S1}$ of the registers have data stored therein (are full). AND-gates 284, 286, 288 and 290 are output connected to the reset terminal of the flip-flop stages $FF_{C1}$ through $FF_{C4}$ of the generator 278. Each of these flip-flops is enabled only when its succeeding flip-flop stage of the generator 278 is reset. Thus, with the second stage $FF_{C2}$ of the generator 278 reset, a reset pulse is propagated through the AND-gate 284 to reset the first stage. This pulse also propagates through the delay circuit $D_3$ and enters the first data word, which is stored in the first stages $FF_{S1}$ of the registers, into the second stages $FF_{S2}$ thereof. The first stage generator flip-flop $FF_{C1}$ is then reset indicating that the first register stages $FF_{S1}$ are clear or empty and ready to receive the next data word. Thus, when the register stages 272 through 276 are initially empty, the first four data words propagate through the register stages and fill the register.

After a short delay in the delay circuit $D_9$ a data time pulse $P_5$ is produced indicating that output data is ready. It is assumed that the data utilization equipment (viz read out the output data upon occurrence of the data time pulse or at least within one word time thereafter, such that the fourth register stages can be assumed to be cleared, each word time as represented by the crystal clock pulse rate. The last generator stage $FF_{C4}$ is not cleared until occurrence of the next crystal clock pulse. Thus, after the first word time, the duration of the $P_4$ pulse which is converted by the delay circuit $D_9$ into the data time pulse $P_4$ is equal to one word time (viz one period of the crystal clock pulse rate). The third flip-flop $FF_{C3}$ of the generator 278 is not permitted to be reset until the fourth flip-flop $FF_{C4}$ is reset. Similarly, the second flip-flop $FF_{C2}$ of the generator 278 is not permitted to be reset, and provide output pulses which will enable the entry of data into the third register flip-flop stages $FF_{S3}$, until the third generator flip-flop $FF_{C3}$ is reset. The entry of the data into the second flip-flop register stages $FF_{S2}$ again is inhibited until these stages are cleared as represented by the second flip-flop $FF_{C2}$ of the generator 278 becoming reset. Accordingly, depending upon the rate at which data is entered into the first stages of the register 272 to 276 (viz the word time rate), the periods during which different words will be stored in different register stages will vary. Data will be read out of the last register stages $FF_{S4}$ in synchronism with the crystal clock pulses, notwithstanding the timing errors in the rate of the data words which are reproduced from the record, decoded and fed into the first stages $FF_{S1}$ of the registers. The system is analogous to a large bucket with a small hole; so long as the bucket is large enough, the rate at which fluid fills the bucket does not affect the constant rate at which the fluid flows out of the hole.

Figure 16:
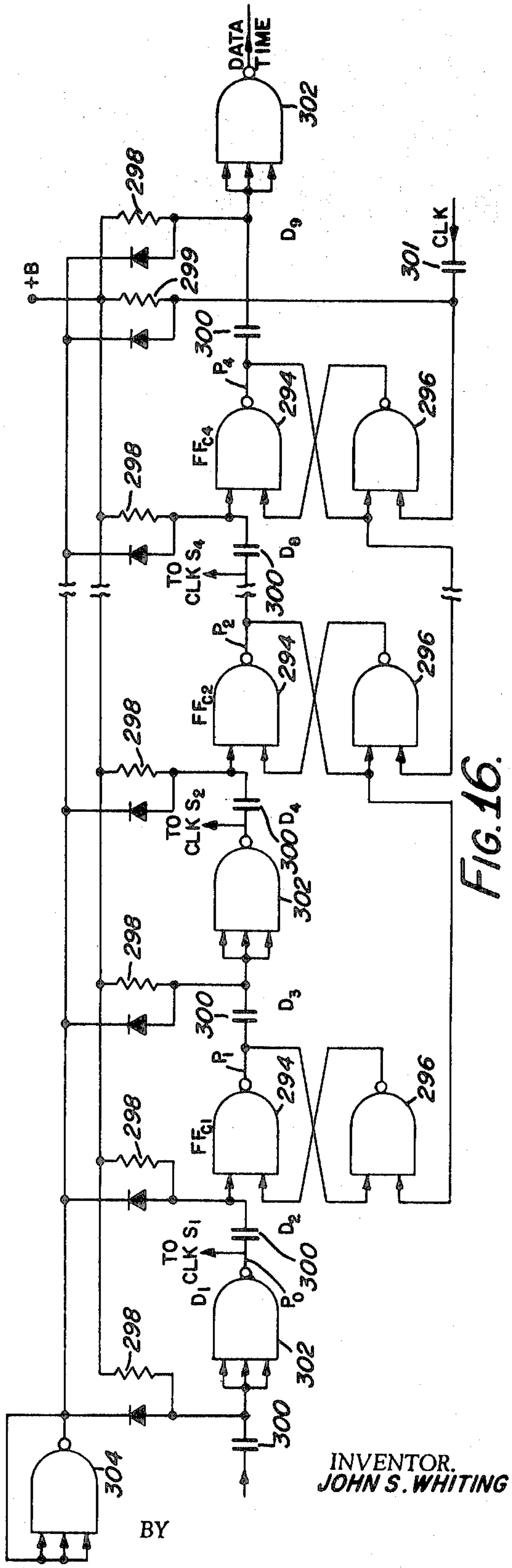
FIG. 16 is a fragmentary logic and circuit diagram of a portion of the retiming synchronizer shown in FIG. 14.

Simplification of the pulse generator 278 may be obtained by utilizing NAND gates to provide the flip-flop stages $FF_{C1}$ to $FF_{C4}$ thereof, as shown in FIG. 16. Each of these flip-flops includes a pair of NAND-gates 294 and 296. The flip-flop gates 296 perform the dual function of as part of the flip-flops and inhibiting reset of the flip-flop much in the same way as the gates 284, 288 and 290 shown in FIG. 14. Capacitors in the input circuits of the first of the NAND-gates 294 of the flip-flops provide the time delay circuits $D_2$, $D_4$, $D_6$ and $D_8$. Other NAND-gates 302 having input capacitors 300 provide the delay circuits $D_1$, $D_3$, $D_5$, $D_7$ and $D_9$. Charging currents for these delay circuits is obtained from a source of operating voltage indicated at +B through resistors 298. These resistors and capacitors 300 afford the requisite time delays. The delay circuits using the NAND-gates 294 and 302 are similar, both structurally and in operation, to the delay circuits 182, 184, 186 (FIG. 9).

Another NAND-gate 304 with its output connected back to its input provides a voltage regulator which clamps the voltage to which the capacitors 300 can charge, thereby establishing equal time delays when NAND gates of the same type are used in the delay circuits and in the flip-flop stages $FF_{C1}$ to $tFF_{C4}$. The clock pulses are also subjected to a short time delay in a delay circuit constituted of a capacitor 301 and resistor 299 and the gate 296 of $FF_{C4}$. This delay accommodates any settling time in the last flip-flop $FF_{C4}$.

The synchronizer and retiming circuits 38 remove timing errors in each of the N channels of reproduced data. There may be timing errors from channel to channel, as are caused by skewing of the tape when a tape record is used. To deskew the multitrack data which arrives at the outputs of the jitter compensators in each of the N channels, the deskewing system shown in FIG. 17 may be used in and as part of the synchronizer 38. This deskewing system operates on the basis that synchronism of the frame words reproduced from each channel occurs when skew timing errors are eliminated. Thus, the frame word from each channel jitter-compensating register 276 (FIG. 14) is applied to an AND-gate 310. Thus, $FW_{(1)}$ through $FW_{(N)}$ are all applied to the AND-gate 310. The clock pulses from the crystal clock 280 are inhibited from being applied to the last register stages upon occurrence of frame word. To this end, AND-gates 312 are inhibited when flip-flops $FF_{W1}$ through $FF_{W(N)}$ are set by their own channel frame words.

Consider that $FW_{(1)}$ occurs first of all of the frame words from the other channels. A clock pulse then enters a frame word into $FF_{W1}$ causing $FF_{W1}$ to be set. AND-gate 312 is then inhibited. Further clock pulses are prevented from being applied to the channel one jitter-compensating registers. As later frame words are recognized in the other channels, clock pulses are inhibited from being applied to their respective jitter compensator registers. Upon the simultaneous presence of the frame words from all channels (viz $FW_{(1)}$ to $FW_{(N)}$ present), an AND-gate 314 is enabled by the output of the gate 310. This AND-gate, however, is enabled only if a valid word or in sync condition is produced at least from the word register 44 which reads the center or N/2 track. The output of the AND-gate 314 is applied to a divide-by-three counter 316. Thus, the frame word must be present for three word times before the counter 316 produces an output. This delay assures that the jitter-compensating registers are storing frame word and that all jitter is removed from each channel. The counter output is applied to the flip-flops $FF_{W1}$ through $FF_{WN}$. On the next clock pulse and these flip-flops are reset and the gates 312 are enabled. Clock pulses are then reapplied through the gates 312 to the jitter compensator register of all of the channels 1 through N and deskewed output data is read out of the system. The system may be conditioned to repeat the foregoing cycle each frame word time, or through the use of counters ahead of the junction of the inputs of the flip-flops $FF_{W1}$–$FF_{WN}$ and gate 310, only at alternate or every third or fourth frame word time. Thus, sufficient information is applied to the deskewing system to assure that the output data is in time coherence from track to track (viz all data is deskewed).

From the foregoing description it will be apparent that there has been provided an improved system for the transmission or storage of digital information. While the system is described in connection with a magnetic tape data storage apparatus, it will be appreciated that the invention is also applicable to other forms of magnetic storage, such as magnetic disc and drum storage, as well as to data transmission in general. Variations and modifications in the herein-described system, within the spirit and scope of the invention, will become apparent to those skilled in the art. The system as described herein should be taken therefore as being illustrative and not in any limiting sense.

What is claimed is:

1. A system for providing output data synchronous with successive words of ternary data, each word being constituted of a certain plurality of terts the average level of which is zero, said system comprising a. means responsive to said terts for providing a first timing signal having a repetition rate equal to the repetition rate of said terts and coherent therewith, b. means responsive to said successive ternary words for providing second timing signals when said certain plurality of terts which constitute said words have said zero average levels, and c. first means for detecting valid ternary words when said second timing signals occur simultaneously with the last of a number of said first timing signals equal to said certain plurality, the detection of said valid words indicating that said output data corresponding to said ternary words is in synchronism therewith.

2. The invention as set forth in claim 1 further comprising second means for detecting the presence of an invalid ternary word when the occurrence of said second timing signal does not coincide with said last of said first timing signals, the detection of said invalid words indicating that said output data corresponding to said ternary words is out of synchronism therewith.

3. The invention as set forth in claim 2 wherein said first and second detecting means includes a. a counter for counting said first timing signals and providing a first output when said number of first timing signals equal to said certain plurality is counted, b. gates responsive to the simultaneous occurrence of said first output and said second timing signals for providing third outputs representing the detection of said valid words and said gates also being responsive to the occurrence of said second timing signals in the absence of said first output for providing fourth outputs representing the detection of said invalid words, and c. means for applying said invalid word outputs to said counter for reducing the count stored therein upon occurrence of each of said invalid word outputs.

4. The invention as set forth in claim 2 wherein said directing means includes a. gates responsive to the simultaneous occurrence of said first and second timing signals and said gates also being responsive to the occurrence of said second timing signals in the absence of said first timing signals for producing outputs representing the detection of said valid words or invalid words, respectively, and means for providing an output indicating synchronism between said ternary data and said output data so long as a first plurality of successive ones of said invalid word outputs does not occur after a plurality of successive ones of said invalid word outputs greater than said first plurality.

5. The invention as set forth in claim 4 wherein frame words are interspersed between successive groups of said ternary words, and including means responsive to said ternary data for providing frame word outputs upon occurrence of said frame words, and wherein means are provided responsive to said frame word outputs for inhibiting the provision of said synchronism indicating output until after occurrence of one of said frame word outputs.

6. The invention as set forth in claim 4 wherein said means for providing said synchronism indicating output includes a. a first counter for counting said valid word outputs and providing a first output pulse when said greater plurality of valid word outputs is counted, b. a second counter for counting said invalid word outputs for providing a second output pulse when said first plurality of invalid word outputs is counted, c. a flip-flop adapted to be conditioned into its first state by said first pulse and into its second state by said second pulse, said flip-flop providing said synchronism indicating output when in its first state, d. means for inhibiting the application of said valid word outputs to said first counter when said flip-flop is in its first state, e. means for inhibiting the application of said invalid word outputs to said second counter when said flip-flop is in its second state, f. means responsive to each of said invalid word outputs for clearing said first counter, and g. means responsive to each of said valid word outputs for clearing said second counter.

7. A system for detecting errors in a serial stream of ternary data derived from a transmission medium, such as a magnetic record, said data being constituted of successive ternary words each made up of a certain plurality of successive terts having positive, negative and zero levels, the average value of the levels of the terts in each word being zero, said system comprising a. means for examining successive tert groups of said data, each containing said certain plurality of said successive terts, each succeeding group including the terts from the preceding group less the first tert in said preceding group, for providing first outputs when the average value of the levels of the terts making up each of said groups is zero, b. means responsive to the fundamental frequency component of said ternary data for providing second outputs at the repetition rate of the terts of said data and coherent therewith, c. means responsive to said second outputs for producing a timing signal upon occurrence of successive numbers of said second outputs equal to said certain plurality, and d. means responsive to the absence of simultaneous occurrence of said timing signals and said first outputs for indicating that the words of said ternary data, occurring when said first outputs do not occur simultaneously with said timing signals, are in error.

8. The invention as set forth in claim 7, wherein said examining means comprises a. means providing storage for at least said certain plurality of terts of said data, b. means for applying said ternary data to said storage means so that each of said successive groups of terts are simultaneously stored therein, and e. means coupled to said storage means and responsive to the sum of the levels of each of the terts in each of said successive groups for providing said first outputs.

9. The invention as set forth in claim 8 wherein a. said storage means includes a multistage shift register, b. said applying means includes means for applying data corresponding to said terts to the input of the first stage of said register and being responsive to said second outputs for shifting said tert data into and advancing said data between successive stages of said register upon occurrence of each of said second outputs, and c. said sum-responsive means includes means for converting the data stored in said register stages from digital to analog signals summing said analog signals and providing said first outputs when the sum of said analog signals is different from zero by less than a given threshold.

10. The invention as set forth in claim 9 wherein said means for indicating errors in said ternary words comprises gating means responsive to said timing signals and said first outputs for producing first pulses indicating good ternary words when said first outputs and said timing signals are coincident with each other and second pulses indicating erroneous bad word when said first outputs do not occur in coincidence with said timing signals.

* * * * *